United States Patent
Rune et al.

(10) Patent No.: US 6,731,932 B1
(45) Date of Patent: May 4, 2004

(54) METHODS AND SYSTEMS FOR HANDLING SUBSCRIBER DATA

(75) Inventors: Johan Rune, Lidingö (SE); Yun Chao Hu, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 534 days.

(21) Appl. No.: 09/645,737

(22) Filed: Aug. 24, 2000

Related U.S. Application Data

(60) Provisional application No. 60/154,543, filed on Oct. 19, 1999, and provisional application No. 60/150,463, filed on Aug. 24, 1999.

(51) Int. Cl.[7] .............................. H04Q 7/20; H04Q 7/22
(52) U.S. Cl. .......................... 455/432.1; 455/432.3; 455/433; 455/435.1; 455/422.1; 455/517
(58) Field of Search .................................. 455/433, 432, 455/435, 445, 436, 403, 422, 550, 552, 500, 517, 426, 432.1, 432.3, 432.2, 435.1, 435.2, 426.1, 442.1

(56) References Cited

U.S. PATENT DOCUMENTS

| | | | |
|---|---|---|---|
| 5,819,178 A | * 10/1998 | Cropper | 455/432 |
| 5,901,353 A | * 5/1999 | Pentikainen | 455/432 |
| 6,370,390 B1 | * 4/2002 | Salin et al. | 455/433 |
| 6,463,154 B1 | * 10/2002 | Patel | 455/433 |
| 6,584,312 B1 | * 6/2003 | Morin et al. | 455/433 |
| 2001/0012779 A1 | * 8/2001 | Skog | 455/433 |

FOREIGN PATENT DOCUMENTS

| | | |
|---|---|---|
| WO | 97/15162 | 1/1997 |
| WO | 99/43175 | 8/1999 |
| WO | 99/43175 A1 | 8/1999 |
| WO | 99/56492 A1 | 11/1999 |
| WO | 99/56492 | 11/1999 |

OTHER PUBLICATIONS

3GPP TSG–CN WG2: "Tdoc 3GPP N2–99 972; Technical Specification; 3rd Generation Partnership Project; Technical Specification Group Core Network; Technical Report on Super–Charger" Online! Jul. 19, 1999, Gotland (SE).

Overview of the Signalling System No. 7, specified by CCITT No. 7.

"3rd Generation Partnership Project; Technical Specification Group Core Network; Technical Report on Super–Charger" 3G TR 23.9.1.2 V3.0.1 (Oct. 1999).

* cited by examiner

Primary Examiner—William Trost
Assistant Examiner—Keith Ferguson

(57) ABSTRACT

Subscriber data in a Super-charged network is handled in a network including a home network entity containing information regarding subscriber in the network and one or more visitor network entities containing subscriber to other networks. A subscriber profile in a visitor network entity may be updated if necessary, and if certain conditions are met. The profile may be updated by sending modifications from the home network entity to the visitor network entity. Depending on the amount of time that has elapsed since the contact of the subscriber and the network, the subscriber's identity may be unallocated. If the subscriber's record is purged from a visitor network entity, an indication of this may be recorded in the home network entity.

70 Claims, 17 Drawing Sheets

FIG. 12A

| Parameter | Value |
|---|---|
| IMSI | 'imsi-X' |
| Revision No. | 6 |
| A | 2 |
| B | 4 |
| C | 1 |
| E | 7 |
| G | 9 |
| N | 8 |
| P | 9 |
| Q | 5 |
| T | 1 |
| V | 2 |

FIG. 12B

| Parameter | Value |
|---|---|
| IMSI | 'imsi-X' |
| Revision No. | 7 |
| A | 2 |
| B | 4 |
| C | 1 |
| E | 7 |
| G | 9 |
| N | 8 |
| P | 9 |
| Q | 5 |
| S | 4 |
| T | 1 |
| V | 2 |

FIG. 12C

| Parameter | Value |
|---|---|
| IMSI | 'imsi-X' |
| Revision No. | 8 |
| A | 2 |
| B | 4 |
| C | 1 |
| E | 7 |
| D | 5 |
| G | 8 |
| N | 8 |
| P | 9 |
| Q | 5 |
| S | 4 |
| T | 1 |
| V | 2 |

FIG. 12D

| Parameter | Value |
|---|---|
| IMSI | 'imsi-X' |
| Revision No. | 9 |
| A | 2 |
| B | 4 |
| C | 1 |
| E | 7 |
| D | 5 |
| N | 8 |
| P | 7 |
| Q | 5 |
| S | 4 |
| T | 1 |
| V | 2 |

| Parameter | Value |
|---|---|
| IMSI | 'imsi-X' |
| Revision No. | 10 |
| A | 2 |
| B | 4 |
| C | 1 |
| E | 7 |
| D | 5 |
| N | 8 |
| P | 7 |
| Q | 5 |
| T | 1 |
| V | 2 |

FIG. 12E

| Parameter | Value |
|---|---|
| IMSI | 'imsi-X' |
| Revision No. | 11 |
| A | 2 |
| B | 4 |
| C | 1 |
| E | 7 |
| D | 5 |
| N | 8 |
| P | 7 |
| Q | 5 |
| T | 1 |
| V | 2 |
| W | 6 |

FIG. 12F

| Subscriber Profile Modification Records | | | | |
|---|---|---|---|---|
| Classification | Record 1 | Record 2 | Record 3 | Record 4 |
| Resulting revision number | 8 | 9 | 10 | 11 |
| New parameters | D = 5 | | | W = 6 |
| Modified parameters | G = 8 | P = 7 | | |
| Deleted parameters | | G | S | |

FIG. 13E

| 'Delta-subscriber-data-message' | |
|---|---|
| Classification | Data |
| New revision number | 11 |
| New or modified parameters | D = 5<br>W = 6<br>P = 7 |
| Deleted parameters | G |
| | S |

FIG. 14

| Subscriber Profile Modification Records | |
|---|---|
| Classification | Record 1 |
| Resulting revision number | 7 |
| New parameters | S = 4 |
| Modified parameters | |
| Deleted parameters | |

FIG. 13A

| Subscriber Profile Modification Records | | |
|---|---|---|
| Classification | Record 1 | Record 2 |
| Resulting revision number | 7 | 8 |
| New parameters | S = 4 | D = 5 |
| Modified parameters | | G = 8 |
| Deleted parameters | | |

FIG. 13B

| Subscriber Profile Modification Records | | | |
|---|---|---|---|
| Classification | Record 1 | Record 2 | Record 3 |
| Resulting revision number | 7 | 8 | 9 |
| New parameters | S = 4 | D = 5 | |
| Modified parameters | | G = 8 | P = 7 |
| Deleted parameters | | | G |

FIG. 13C

| Subscriber Profile Modification Records | | | | |
|---|---|---|---|---|
| Classification | Record 1 | Record 2 | Record 3 | Record 4 |
| Resulting revision number | 7 | 8 | 9 | 10 |
| New parameters | S = 4 | D = 5 | | |
| Modified parameters | | G = 8 | P = 7 | |
| Deleted parameters | | | G | S |

FIG. 13D

METHODS AND SYSTEMS FOR HANDLING SUBSCRIBER DATA

This application claims priority under 35 U.S.C. § 119(e) to application Ser. Nos. 60/150,463 and 60/154,543 filed in the United States on Aug. 24 and Oct. 19, 1999, respectively; the entire content of which are hereby incorporated by reference.

BACKGROUND

This invention relates generally to methods and systems for handling subscriber data. More particularly, this invention relates to methods and systems for updating and modifying subscriber data, unallocating subscriber identities, and indicating that subscriber identities have been purged.

There are many types of public land mobile networks (PLMNs), e.g., a Global System for Mobile Communications (GSM), a Digital Cellular System for Mobile Communications (DCS 1800), and a Personal Communication System (PCS). These networks provide a wide range of services and facilities to mobile subscribers that are roaming around between individual cells of the mobile radio communication networks.

A Universal Mobile Telecommunications System (UMTS) is currently being standardized within the 3rd Generation Partnership Project (3GPP), which is a cross-regional cooperative project to develop a third generation standard which can be accepted in as many regions of the world as possible. The UMTS will build on the success of GSM.

Network entities communicate via a common signalling system. For example, in the GSM System, the Mobile Application Part (MAP) of the Signaling System No. 7 specified by CCITT is used to communicate between entities in the PLMN. Details of this signalling system are given in Digital Cellular Telecommunications System (Phase 2+), Mobile Application Part (MAP) specification, TS GSM 09.02 v.5.6.00, which is incorporated herein by reference. The UMTS MAP will be based on the latest version of GSM MAP, with the minimum number of modifications possible.

The UMTS will support both circuit switched data communication, as used in traditional voice networks and packet switched communication, as provided by, e.g., the General Packet Radio Service (GPRS). Thus, the UMTS will be useful for exchanging voice and non-voice data quickly and efficiently.

FIG. 1 illustrates an exemplary network architecture for UMTS. In FIG. 1, a mobile station (MS) communicates with one or more Public Land Mobile Networks Each PLMN includes one or more Mobile Switching Centers (MSCs) for performing circuit switching for the MS.

A first network (PLMN1) is considered the Home PLMN (HPLMN) and includes a Home Location Register (HLR) containing subscriber data for subscribers to the network. The HPLMN also includes a Gateway GPRS Support Node (GGSN) for enabling packet-switched communication.

PLMN2 and PLMN3 are considered visiting PLMN and include one or more Visitor Location Registers (VLRs) for storing data regarding subscribers to other networks that may be roaming in the network. PLMN2 and PLMN3 also include Serving GPRS Support Nodes (SGSNs) for supporting packet switched communication.

The HLR of PLMN1 communicates with VLR1 (of PLMN2) and VLR2 and VLR3 (of PLMN3) for updating subscriber information, e.g., when a subscriber roams into an area served by one of these VLRs. The VLRs also communicate with each other. For example, when a subscriber roams into a new location area served by a VLR, this VLR referred to as a "new VLR", the VLR serving the location area in which the subscriber was previously located, i.e., the "previous VLR", communicates with the new VLR, providing subscriber information.

The SGSNs are at the same hierarchal level and function in a similar manner as the MSCIVLRs, but for packet switched communication for subscribers roaming between the service areas of the SGSNs. The SGSNs keep track of the location of the GPRS user, perform security functions, and handle access control. The SGSNs communicate with the HLR to obtain subscriber profiles. The SGSNs also communicate with each other, and the SGSN of PLMN3 communicates with the BSS which, in turn, communicates with the MSC connected to VLR2.

The GGSN is the interconnection point for packet data between the GPRS network and the public data network. The GGSN is connected to the SGSNs via an Internet Protocol (IP) backbone. User data, e.g., from a GPRS terminal connected to the Internet, is sent encapsulated over the IP Backbone. The GGSN is connected to the HLR for obtaining routing information for routing packet data to and from the SGSNs. The GGSN may also be connected to other GGSNs to facilitate roaming.

In the following, the difference between the mobility management procedures, in particular the location update procedures for the non-GPRS case, in standard GSM networks and the procedures in UMTS networks using the Super-Charger concept will be described. The differences are illustrated by first describing the location update procedures in standard GSM networks and then describing the corresponding procedures (and some additional procedures) used in UMTS networks employing the Super-Charger concept.

During a standard GSM location update procedure, during which a subscriber roams into an area served by a new VLR, the new VLR retrieves the International Mobile Subscriber Identity (IMSI) of the concerned subscriber. If the subscriber uses the IMSI for identification in a location update request sent to the new VLR from the subscriber, the IMSI is already available to the new VLR. However, if the subscriber uses a Temporary Mobile Subscriber Identity (TMSI) for identification so as to protect the integrity of the subscriber identity, the new VLR has to retrieve the IMSI from the previous VLR.

This may be understood with reference to FIG. 2 which illustrates a signaling sequence for a location update procedure in a standard GSM network in which the MS identifies itself with the TMSI. In FIG. 2, the BSS nodes and the authentication procedure have been omitted for simplicity.

As shown in FIG. 2, the location update procedure begins with the MS sending a location update request to the new VLR. The previous VLR is identified via an old location area identity, which is included in the location update request from the MS. The new VLR then requests the IMSI from the previous VLR by sending a MAP SEND ID request message, including the TMSI, to the previous VLR. The previous MSC/VLR returns the IMSI of the subscriber in the MAP SEND ID response message, together with any unused authentication triplets.

When the IMSI is retrieved, the new VLR sends a MAP UPDATE LOCATION indication message to the HLR of the concerned subscriber's home network, i.e., the HPLMN. The HPLMN may, of course, be the same PLMN as that to which the new VLR belongs. The HLR then sends a MAP CANCEL LOCATION indication message to the previous VLR. The previous VLR then deletes the record of the concerned subscriber from its database and sends a MAP CANCEL LOCATION confirm message to the HLR. The HLR then sends the subscriber profile of the concerned subscriber to the new VLR in one or several MAP INSERT SUBSCRIBER DATA (ISD) indication message(s), depending on the amount of data. The new VLR responds with a MAP INSERT SUBSCRIBER DATA response message. After the ISD procedure, the HLR sends a MAP UPDATE LOCATION response message to the new VLR, and a similar acknowledgment is sent to the MS by the new VLR. Thereby, the location update procedure in the network is completed.

More details on the location update procedures in GSM can be found in TS GSM 9.02, "Digital Cellular telecommunication system (Phase 2+); MAP specification.

In the GPRS case, the corresponding signaling is similar. The signaling between the new SGSN and the HLR and between the HLR and the previous SGSN is, in principle, the same as between the new VLR and the HLR and between the HLR and the previous VLR in the non-GPRS case. However, the signaling between the new SGSN and the previous SGSN is somewhat different.

This may be understood with reference to FIGS. 3 and 4 which illustrate the signalling sequences for a GPRS Attach procedure and a Routing Area Update Request, respectively, in a standard GSM GPRS network. The BSS nodes and the authentication procedure have been omitted for simplicity.

In the GPRS Attach case, the MS requests GPRS service from a new SGSN. If the request is successful, this changes the mobility management state of the MS from IDLE to READY. Referring to FIG. 3, in the GPRS Attach procedure, if the MS uses the Packet TMSI, (P-TMSI), i.e., the temporary identity corresponding to the TMSI in the non-GPRS domain for identification, the new SGSN requests the IMSI from the previous SGSN with an Identification Request message. The IMSI (and any unused authentication triplets) is returned from the previous SGSN to the new SGSN in an Identification Response message. From this point, the process proceeds, in principle, as in the non-GPRS case described above with regard to FIG. 2.

In the inter-SGSN Routing Area Update case, the GPRS-attached MS, i.e., an MS that is in a STANDBY or READY state moves from one routing area served by one SGSN to another routing area served by another SGSN. Referring to FIG. 4, the IMSI and unused authentication triplets are transferred from the previous SGSN to the new SGSN. The new SGSN requests data from the previous SGSN with a SGSN Context Request message. The IMSI and more data, e.g., the Packet Data Protocol (PDP) Context, which is needed to enable transfer of data packets from the previous SGSN to the new SGSN and from the GGSN to the new SGSN, are returned from the previous SGSN to the new SGSN in a SGSN Context Response message. In this case, the GGSN is also involved in the signaling procedure. From this point, the process proceeds, in principle, as in the non-GPRS case described above with regard to FIG. 2.

Every time a subscriber moves to a location served by a new VLR or SGSN, the subscriber data must be downloaded from the HLR in the HPLMN to the new VLR or SGSN serving the user and deleted in the previous VLR or SGSN. If the location areas associated with these entities are small or the subscriber frequently moves between the location areas, this downloading creates a large signalling load. This applies to subscribers moving within their home network and roaming subscribers. For roaming subscribers, international signalling costs are incurred.

The MAP INSERT SUBSCRIBER DATA (ISD) messages that are used for transmitting the subscriber profile of a concerned subscriber to a new VLR include rather large amounts of data, thus placing a significant load on the signaling networks, especially on the international signaling links in the case of roaming between different PLMNs.

A Super-Charger concept is being designed to reduce the signaling in the networks, mainly by eliminating the majority of the ISD messages but also by eliminating the MAP CANCEL LOCATION messages by which the subscriber profiles in the previous VLRs and SGSNs are deleted. This is achieved by not deleting the subscriber data from the VLR database when the subscriber leaves the service area of the VLR. Instead, the subscriber data is retained in the previous VLR and can be reused the next time the subscriber registers in the same VLR. Since the subscriber data is retained in the VLR, the MAP CANCEL LOCATION message from the HLR is unnecessary and can be eliminated. When the subscriber profile is already present in a new VLR, there is no need to transfer the subscriber profile from the HLR, provided of course that the subscriber has been registered in that VLR before. Thereby, the ISD message(s) are eliminated too.

It is important that the subscriber profile used in the VLR is up to date, i.e., that the subscriber profile used in the VLR is that same as that currently stored in the HLR. To ensure this data consistency, some kind of revision management mechanism for the subscriber profiles is needed. A time stamp and a sequence number associated with each new version of the subscriber profile have been suggested, among other solutions. The time stamp, sequence number, or other type of parameter, may be generally referred to as a revision management parameter.

A signaling sequence illustrating a location update procedure when the Super-Charger concept is used, provided that the subscriber has previously been registered in the new VLR and provided that the retained subscriber profile is up to date, is depicted in FIG. 5. The BSS nodes and the authentication procedure have been omitted for simplicity.

Referring to FIG. 5, when the MAP UPDATE LOCATION indication message is sent to the HLR by the new VLR, the revision management parameter associated with the version of the subscriber profile currently stored in the new VLR is included. The HLR compares the received revision management parameter with that associated with the subscriber profile version currently stored in the HLR and determines whether the subscriber profile stored in the new VLR needs to be updated. If updating is needed, the HLR transfers the updated subscriber profile and its associated revision management parameter to the new VLR in the ISD message(s). The new VLR then deletes the previously stored subscriber profile (and its associated revision management parameter) from its database and stores the received subscriber profile (and its associated revision management parameter) in its place. If the HLR determines that the subscriber profile version in the new VLR is the same as the one stored in the HLR, no ISD message is sent to the new VLR. Instead, the HLR sends the MAP UPDATE LOCATION response message to the new VLR, as shown in FIG. 5. If the revision management parameter is not included in the MAP UPDATE LOCATION message received from the new VLR, the HLR performs the standard location update procedures, i.e., the subscriber profile (without its associated revision management parameter) is transferred to the new VLR in ISD message(s).

When the HLR receives a MAP UPDATE LOCATION message including a revision management parameter, it marks the new VLR as "supporting the Super-Charger concept" in its database. The HLR also checks its database to determine whether the previous VLR supports the Super-Charger concept. If the previous VLR does support the Super-Charger concept, the HLR does not send a MAP CANCEL LOCATION message. Otherwise, the MAP CANCEL LOCATION message is sent as in a standard GSM system.

More details on the location update procedures when the Super-Charger concept is used can be found in Tdoc, 3GPP N2-99 972, "$3_{rd}$ Generation Partnership Project; Technical Specification Group Core Network; Technical Report on Super-Charger" from 3GPP, incorporated herein by reference.

The Super-Charger concept is equally applicable for the SGSN in the GPRS domain. It works in, in principle, the same way in this case. There are some differences that will be discussed below, as they become relevant.

There are a number of problems associated with the conventional Super-Charger concept. One problem is the efficiency.

The efficiency of the Super-Charger concept can be improved in several ways. One way is to attempt to further reduce the international signaling load due to the transfer of updated subscriber profiles in MAP INSERT SUBSCRIBER DATA messages.

Two other problems are related to the Temporary Mobile Subscriber Identity (TMSI). The TMSI is a short temporary identifier, which is unique only within one location area and which is reused as subscribers come and go in the location area. Hence, the TMSI value range is a limited resource. Normally, a TMSI is allocated to a subscriber upon a location update in a new location area. The TMSI is unallocated when the subscriber leaves the location area, thereby making it available for allocation to other subscribers. It can then, at the discretion of the operator, be reallocated during subsequent contacts between the subscriber and the network.

If the new location area is managed by the same VLR, the VLR has full control of what is happening and can unallocate the TMSI in the old location area as soon as the subscriber sends a location update request in the new location area. However, if the new location area is managed by another VLR, the unallocation of the TMSI in the old location area is triggered by the MAP CANCEL LOCATION message from the HLR to the previous VLR.

In the Super-Charger concept, the MAP CANCEL LOCATION message is removed, and consequently the TMSI is not unallocated in the normal way. In fact, the previous VLR is not made aware that the subscriber has left its service area. For the GPRS case, the P-TMSI is managed by the SGSN in a similar way, and the P-TMSI management is affected in the same way as the TMSI management by the removal of the MAP CANCEL LOCATION message.

Currently, there is no provision in the Super-Charger concept for unallocating the TMSI and the P-TMSI. Thus, the efficiency of the TMSI and the P-TMSI is decreased.

Another problem with the Super-Charger concept is that there is currently no provision for deleting subscriber profiles from a VLR and indicating that the profiles have been deleted to the HLR.

In the current GSM system, a subscriber profile can be removed from a VLR after a certain period, e.g., several days, of inactivity. In such a case, a MAP PURGE MS message is sent from the VLR to the HLR to inform the HLR of the action and to prevent unnecessary MAP PROVIDE ROAMING NUMBER request messages concerning the purged subscriber.

As new subscribers are served, the database of the VLR will keep growing. Thus, here is a need for a database management function in the VLR to discard old subscriber data (according to some algorithm) to prevent the database from becoming full.

According to the Super-Charger concept, when a subscriber record is deleted due to database management reasons, the HLR is not informed, as opposed to the standard GSM system where a MAP PURGE MS message is sent to the HLR.

The elimination of the MAP PURGE MS message means that there is a possibility that the HLR believes that the subscriber (whose record was deleted from the VLR) is still registered in the same VLR (if the HLR has not received a MAP UPDATE LOCATION message concerning the same subscriber from another VLR). This, in turn, means that the HLR may send a MAP PROVIDE ROAMING NUMBER request message to the VLR when a call is to be routed to the concerned subscriber. The VLR is then supposed to return the MAP PROVIDE ROAMING NUMBER response message including an Absent Subscriber Error with the new diagnostic information "MS Purged". Upon reception of this "MS Purged" indication, the HLR can set the "MS Purged for Non-GPRS" flag in the subscriber record of the concerned subscriber.

This handling of the MAP PROVIDE ROAMING NUMBER request has yet another consequence. It means that upon receipt of a MAP PROVIDE ROAMING NUMBER request for a subscriber for whom there is no data record in the VLR, the VLR must be able to distinguish between the case when the subscriber profile was removed by the Super-Charger database management function, in which case the MAP PROVIDE ROAMING NUMBER response message is returned to the HLR with the error information described above, and the case when the subscriber profile was lost due to a VLR restart, in which case the normal VLR database restoration procedure is initiated.

It has also been proposed to eliminate the MAP SEND IDENTIFICATION messages by which the new VLR retrieves the IMSI from the previous VLR, in case the subscriber used the TMSI for identification in the location update request. Instead, the new VLR is supposed to retrieve the IMSI from the MS via the MAP PROVIDE IMSI procedure.

In the current GSM system, the HLR can include a "Freeze TMSI" parameter in the MAP PURGE MS response message. This parameter may be used if the VLR number stored for the concerned subscriber in the HLR is the same as the VLR number received in the MAP PURGE MS message. This is a precaution for preventing double allocation of a TMSI, e.g., when the HLR has not received a location update for the subscriber in another VLR, i.e., when, according to the records of the HLR, the subscriber is still located in the service area of the VLR from which its subscriber record was purged. The frozen TMSI is made available again at a subsequent location update by the concerned subscriber in the same VLR, at the reception of a MAP CANCEL LOCATION message for the concerned subscriber, or, in extreme cases, by operation and maintenance interventions.

In a Super-charged network, the above-described protection against double allocation of a TMSI is removed, together with the MAP PURGE MS message, thus creating ambiguity problems. The P-TMSI management is affected similarly by the removal of the MAP PURGE MS message from the SGSN to the HLR and the consequently removed possibility for the HLR to reply with a "Freeze P-TMSI" parameter.

The removal of the Map Purge MS message also creates a problem in network requested PDP context activation in preparation for mobile terminating GPRS packet delivery. To illustrate this problem, it is useful to describe the successful and the unsuccessful cases of network-requested PDP context activation. FIG. 6 illustrates a signaling sequence for the successful case of a network-requested PDP context activation. The BSS nodes have been omitted for simplicity.

As shown in FIG. 6, when a mobile terminated PDP Packet Data Unit (PDU), i.e., a data packet, arrives at the GGSN, the GGSN interrogates the HLR for routing information using a MAP SEND ROUTING INFO FOR GPRS request message. If the concerned subscriber is not known by the HLR to be unreachable, the HLR returns the SGSN Address of the SGSN currently serving the subscriber in a MAP SEND ROUTING INFO FOR GPRS response message. The GGSN then sends a PDU Notification Request to the SGSN, including the IMSI, the PDP Type and the PDP Address. The SGSN acknowledges this message by sending a PDU Notification Response to the GGSN and sends a Request PDP Context Activation message to the MS. After this, the actual PDP Context Activation Procedure begins between the GGSN and the MS.

The GGSN may store the address of the SGSN with which the GGSN established the last PDP context for the concerned subscriber. The stored SGSN address would be valid during a certain limited time, during which an inquiry to the HLR would be prevented. However, it is very unlikely that the subscriber record would be purged from the SGSN database during this limited time. If a subscriber record had to be discarded, a database management function would rather choose to discard a subscriber record that had not been used for a very long time.

If the destination subscriber is marked as not reachable in the HLR, the HLR indicates this in its MAP SEND ROUTING INFO FOR GPRS response message to the GGSN so that the GGSN can avoid wasting signaling resources and processing power on an unsuccessful PDU Notification Request to the SGSN.

The signaling sequence for the unsuccessful case of a network-requested PDP context activation is illustrated in FIG. 7. The BSS nodes have been omitted for simplicity.

As shown in FIG. 7, if the PDP Context activation fails before the Request PDP Context Activation message is sent from the SGSN to the MS, e.g., because the concerned IMSI is not known in the SGSN, e.g., because it was previously discarded by the database management function, the SGSN returns an error indication to the GGSN in the PDU Notification Response message. The indicated error cause may be, e.g., "IMSI Not Known" or "MS GPRS Detached". Another scenario is that the Request PDP Context Activation message is sent to the MS, and then the PDP Context Activation fails. The SGSN then indicates the error cause in a PDU Notification Reject Request message to the GGSN, but this scenario is not relevant to this discussion.

When the GGSN receives a PDU Notification Response message (or a PDU Notification Reject Request) with an error indication from the SGSN, it reports the failure and the reason for the failure to the HLR in a MAP FAILURE REPORT indication message. This message is confirmed by the HLR with a MAP FAILURE REPORT confirm message. The error causes reported in the MAP FAILURE REPORT indication message to the HLR may be, e.g., "System Failure", "Data Missing", "Unexpected Data Value" or "Unknown Subscriber" (all are values of the User Error parameter). Upon reception of the MAP FAILURE REPORT indication message, the HLR sets a "Mobile Station Not Reachable for GPRS" (MNRG) flag for the concerned subscriber (if the flag is not already set). The HLR may also indicate the reason in a "Mobile Not Reachable Reason" (MRRR) parameter.

Before sending the MAP FAILURE REPORT indication message, if the error cause was "IMSI Not Known", the GGSN may try to retrieve a new SGSN address (assuming that the MS might have moved to another SGSN) by sending a MAP SEND ROUTING INFO FOR GPRS request message to the HLR. If a SGSN address other than that already tried is returned from the HLR, the network-requested PDP context activation procedure starts all over again. Otherwise, the MAP FAILURE REPORT indication message is sent to the HLR.

As described above, a request for a roaming number concerning a subscriber whose record has been discarded from the VLR by the Super-Charger database management function results in a "MS Purged" indication from the VLR to the HLR, so that the HLR subsequently can set the "MS Purged for Non-GPRS" flag for the concerned subscriber, thereby preventing subsequent attempts to reach the concerned subscriber with mobile terminated calls or short messages. However, there is no corresponding way for the HLR to receive the information that the concerned MS has been discarded from the SGSN database. Hence, the "MS Purged for GPRS" flag is never set in the HLR. Thus, unsuccessful network-requested PDP context activation (i.e., mobile terminated GPRS packet delivery attempts) and mobile terminated short messages destined for the concerned subscriber may still be routed to the SGSN if the HLR has not received a MAP UPDATE GPRS LOCATION indication message from another SGSN. This packet or short message cannot be forwarded by the SGSN to the MS. If the "MS Purged" status could be conveyed from the SGSN to the HLR as a consequence of an unsuccessful network-requested PDP context activation for a subscriber whose record has been discarded from the SGSN by the Super-Charger database management function, the efficiency of the Super-Charger concept would be improved.

Thus, there is a need for techniques for solving the problems in subscriber data handling in the Super-Charger concept.

SUMMARY

It is therefore an object of the invention to improve the efficiency of the handling of subscriber data.

According to exemplary embodiments, this and other objectives are met by a method and system for handling subscriber data for a subscriber roaming in a network including a home network entity containing information regarding subscribers to the network and one or more visitor network entities containing information regarding subscribers to one or more other networks. The network may support circuit-switched communication and/or packet-switched communication.

According to a first embodiment, a method and system are provided for updating a subscriber profile. An update location request is received at a new visitor network entity serving an area into which the subscriber roamed from an area served by a previous visitor network entity, and the update location request is indicated to the home network entity. A determination is made whether a subscriber profile of the subscriber stored in the new visitor network entity needs updating and whether conditions for updating the subscriber profile stored in the new visitor network entity from the previous visitor network entity are met. If the subscriber profile needs updating and the conditions are met, the subscriber profile stored in the new visitor network entity is updated from the previous visitor network entity.

According to a second embodiment, a method and system are provided for sending only modifications to a profile for updating the profile. At the home network entity, a request is received to update a subscriber profile stored in a visitor network entity. A determination is made whether modifications recorded in the home network entity are sufficient to enable updating of the subscriber profile. If the modifications recorded are sufficient, the modifications are sent from the home network entity to the visitor network entity.

According to a third embodiment, a method and system are provided for handling unallocation of subscriber identities. As one alternative, a subscriber identity may be unallocated upon receipt of a request for identification of a subscriber at a previous visitor network entity serving an area from which the subscriber has roamed. As another alternative, a determination is made whether a predetermined amount of time has elapsed since the last contact between the subscriber and the network. If so, the use of a subscriber identity of the subscriber in the network is prevented.

According to a fourth embodiment, a method and system are provided for handling packet context activation failure. A determination is made whether an attempted packet activation by the network for a subscriber at one of the visitor network entities is successful. If the packet activation fails, the failure is indicated to the home network entity, and a determination is made whether the failure was caused because a subscriber record was purged. If the failure was caused because a subscriber record was purged, the home network entity records that a subscriber profile for the subscriber has been purged.

BRIEF DESCRIPTION OF THE DRAWINGS

The features, objects, and advantages of the invention will become apparent by reading this description in conjunction with the accompanying drawings, in which like reference numerals refer to like elements and in which:

FIGS. 12A–12F illustrate different versions of an exemplary subscriber profile;

FIGS. 13A–13E illustrate modification record tables;

FIG. 14 illustrates an exemplary delta subscriber data message;

DETAILED DESCRIPTION

According to exemplary embodiments, techniques are provided for handling subscriber data using the Super-Charger concept in an efficient manner.

According to a first embodiment, a technique is provided for updating subscriber data in an efficient manner.

According to the Super-Charger concept, when the retained subscriber profile in a VLR in which a subscriber is trying to register is outdated, it is updated via one or more INSERT SUBSCRIBER DATA message(s) from the HLR. When the subscriber is roaming from another PLMN, this most likely means that the ISD message(s) are sent via international signaling links. These international signalling links impose a heavy burden on system resources.

Figure 1:
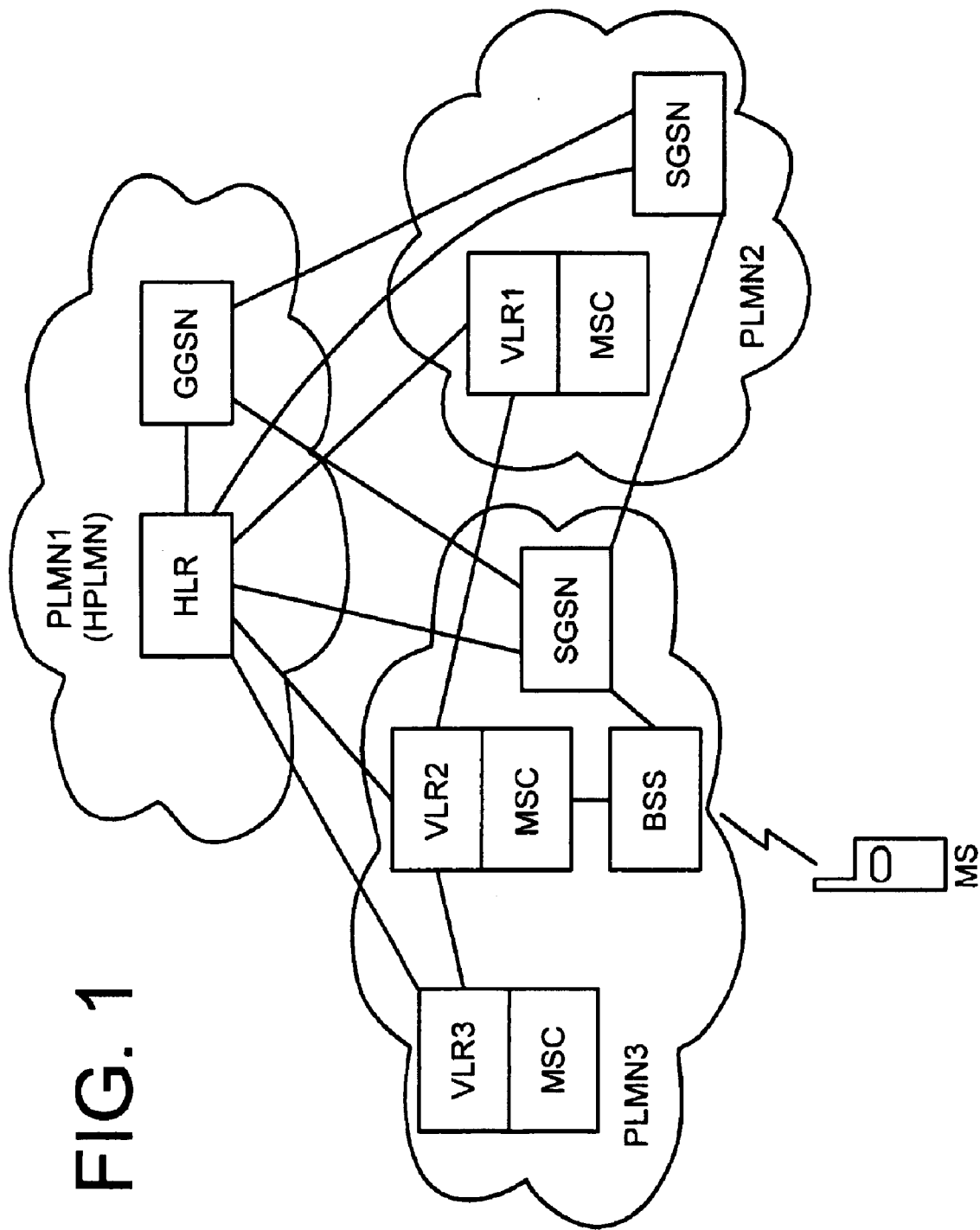
FIG. 1 illustrates an exemplary network architecture for UMTS.
Figure 2:
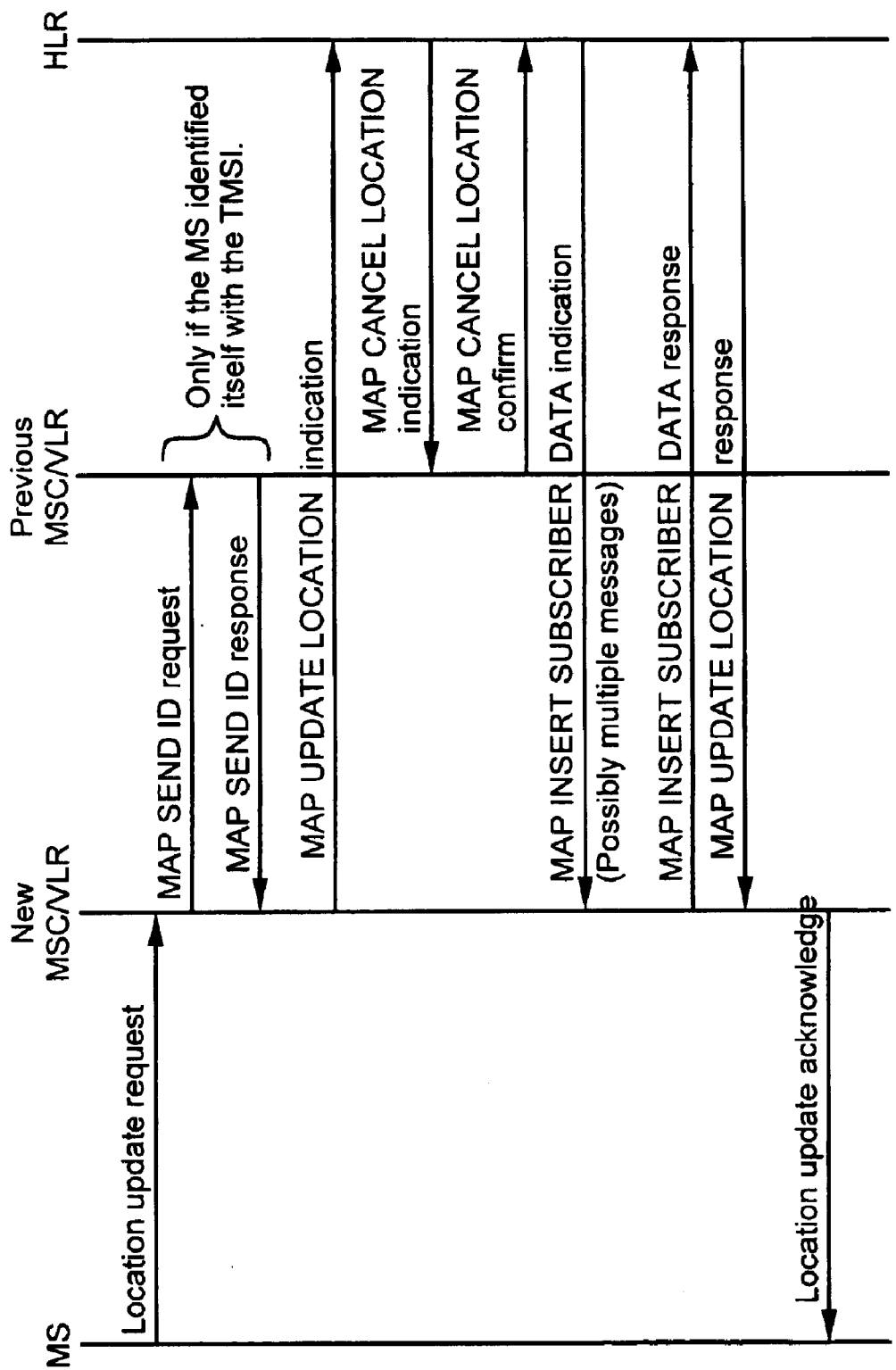
FIG. 2 illustrates a typical signalling sequence for a location update procedure.
Figure 3:
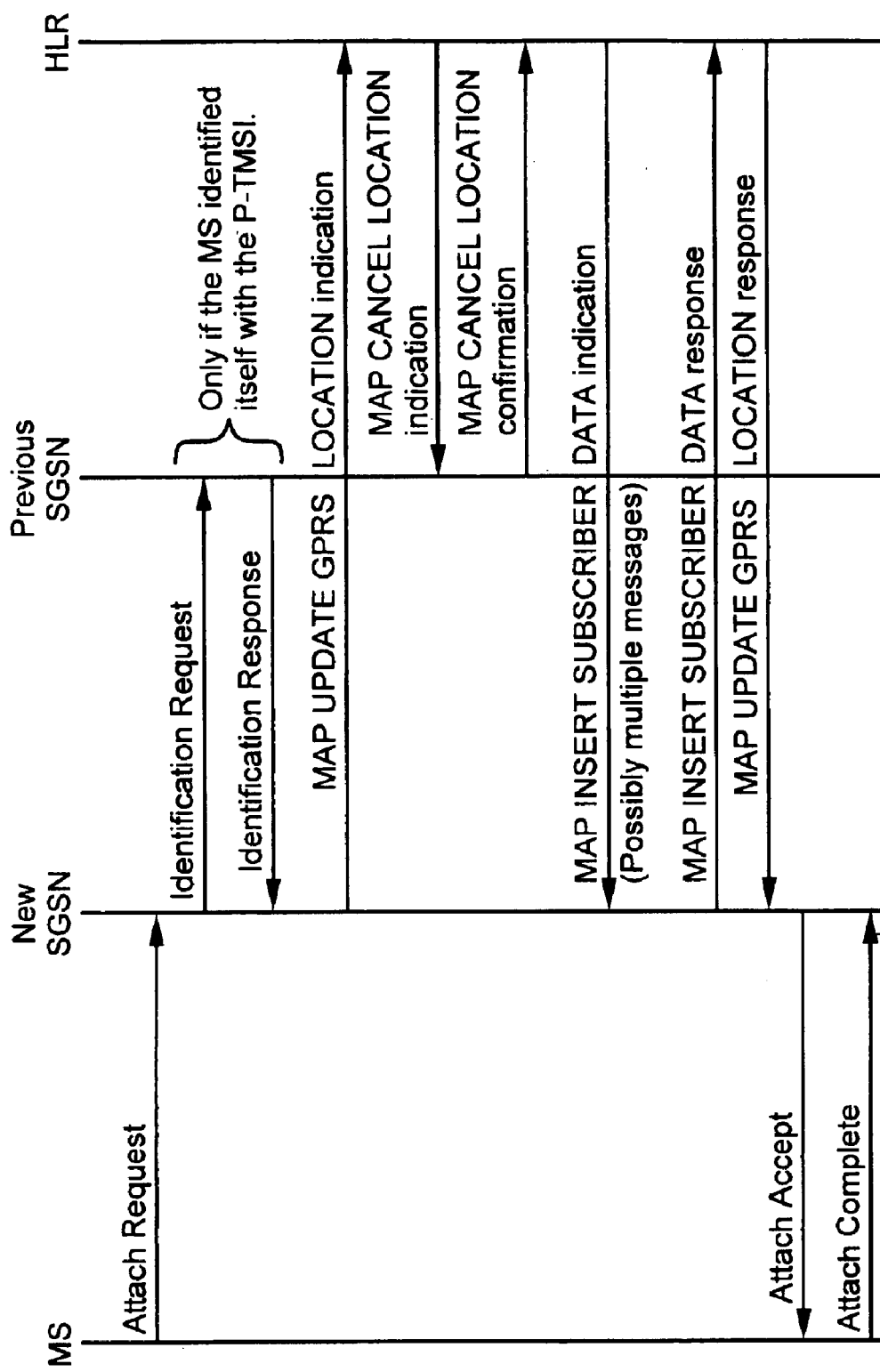
FIG. 3 illustrates a typical signalling sequence for a GPRS Attach procedure.
Figure 4:
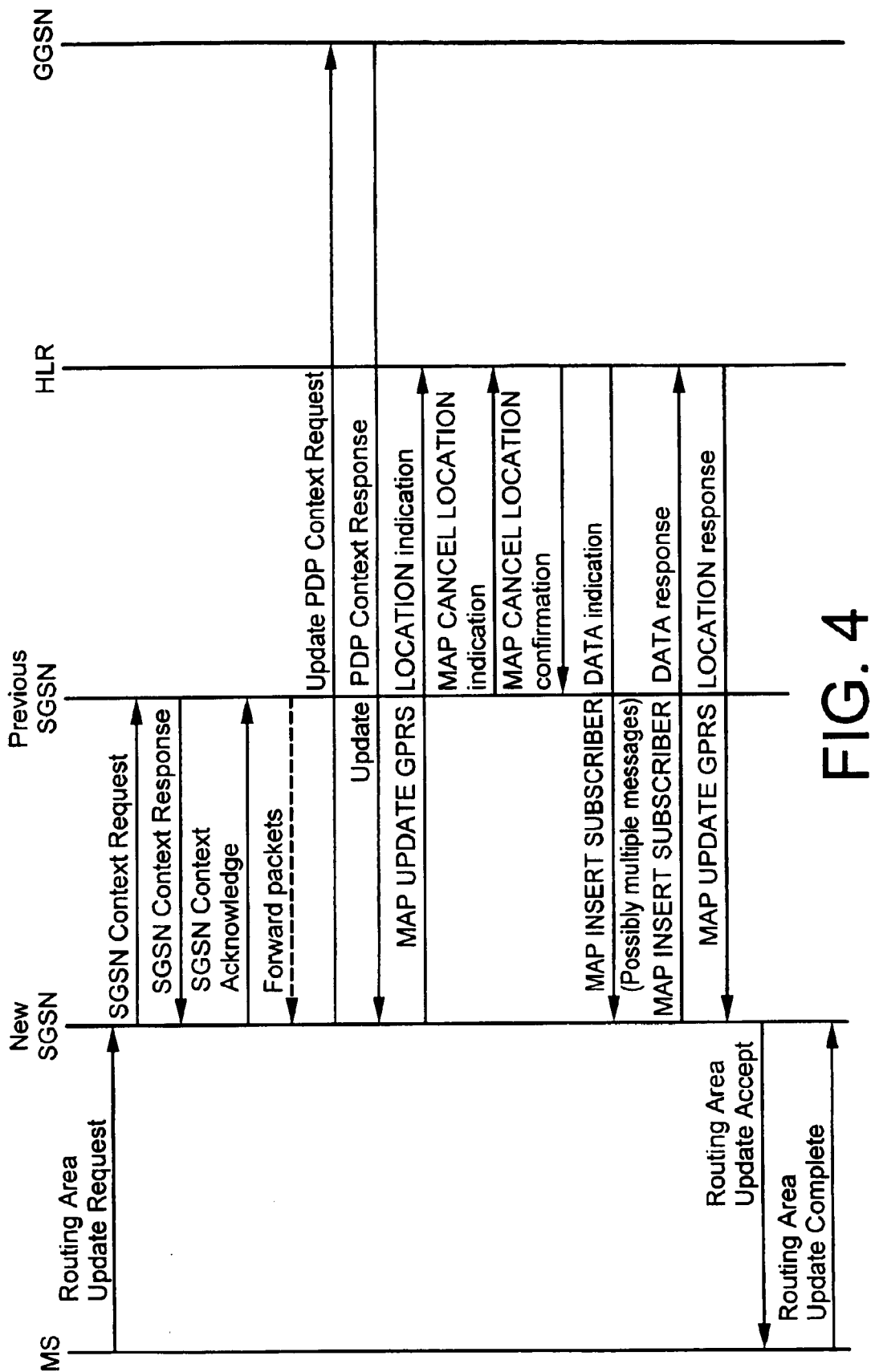
FIG. 4 illustrate a typical signaling sequence for an inter-SGSN Routing Area Update procedure.
Figure 5:
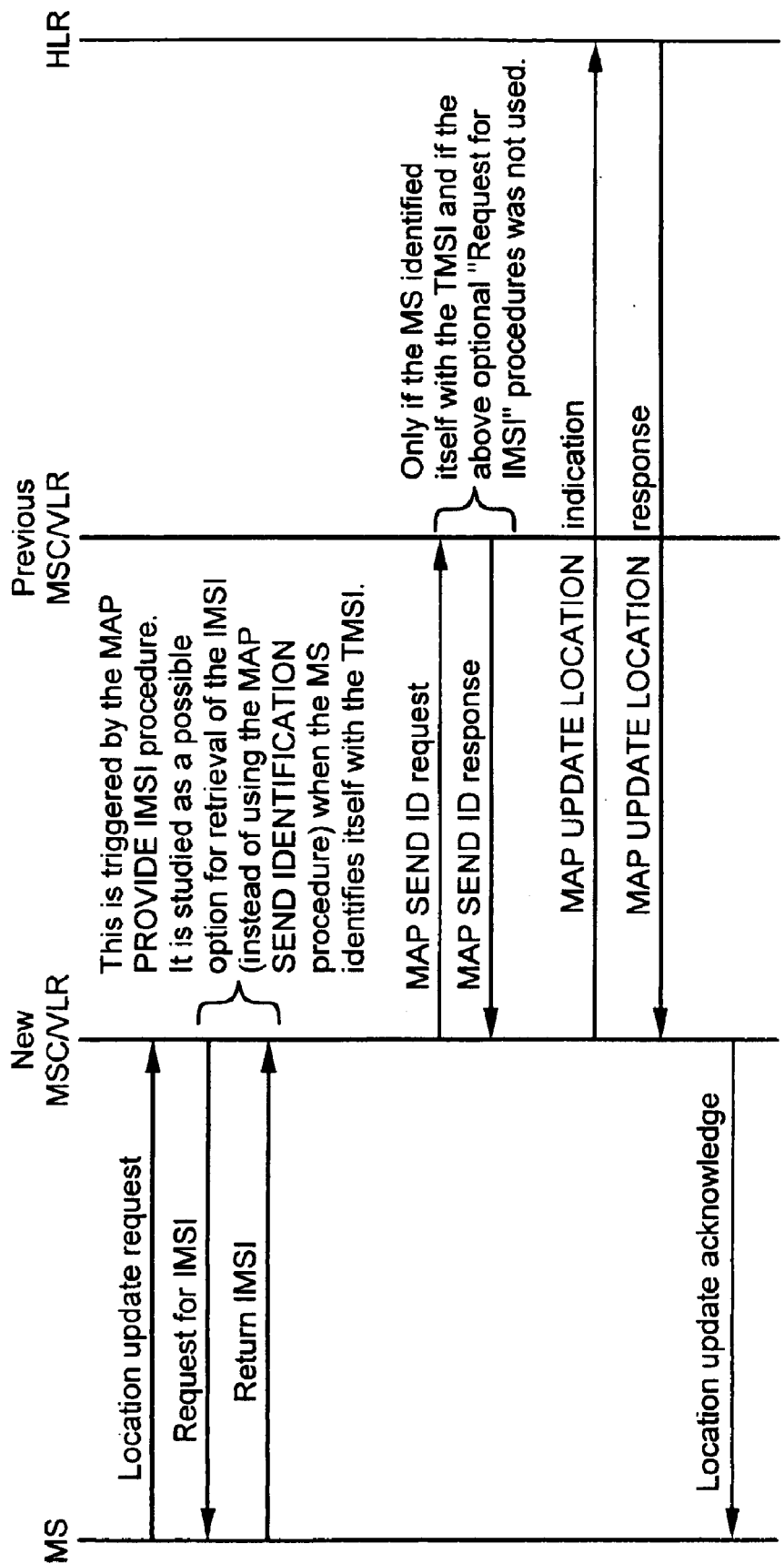
FIG. 5 illustrates a typical signalling sequence for a location update procedure using the Super-Charger concept.

One way to reduce the international signaling is to, at the discretion of the HLR, retrieve the updated subscriber profile from the previous VLR, provided that the previous VLR is located in the same PLMN as the new VLR, e.g., when the MS in FIG. 1 moves from, e.g., the service area of VLR3 to the service area of VLR2.

The signalling sequence is different when the subscriber provides the IMSI than when the subscriber provides the TMSI for identification in the location update request. In both cases, the new VLR can determine whether the previous VLR is located in the same PLMN by looking at the Previous Location Area Identity parameter received in the MAP UPDATE LOCATION AREA request. The HLR can achieve the same result by comparing the VLR numbers, e.g., the Country Codes and the National Destination Codes, of the new VLR and the previous VLR.

International signaling may also be avoided if the previous VLR is located in the same country as the new VLR. The country of the previous VLR can be derived by the new VLR from the country code included in the Previous Location Area Identity parameter received in the MAP UPDATE LOCATION AREA request. The HLR can achieve the same result by comparing the VLR numbers (specifically the Country Codes) of the new VLR and the previous VLR.

Figure 8:
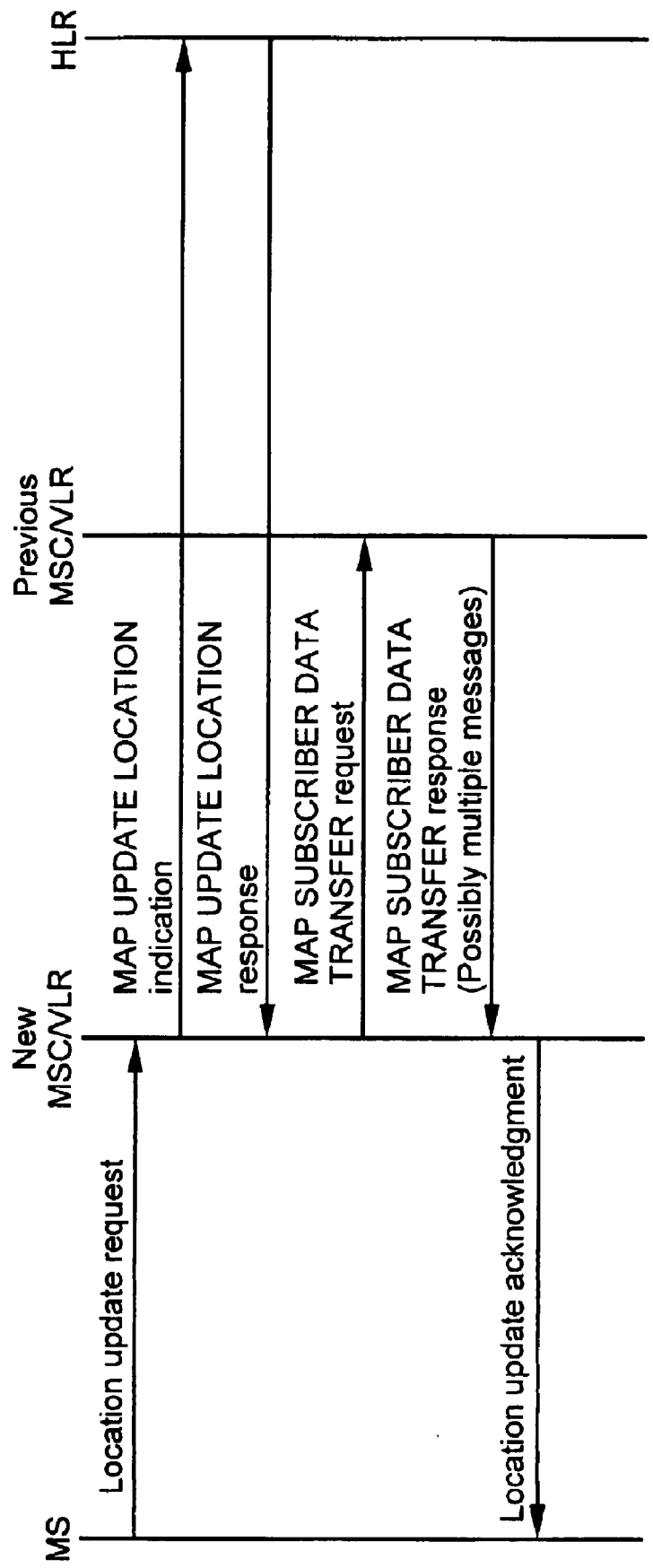
FIG. 8 illustrates a signalling sequence for a successful location update procedure when the subscriber identifies himself with the IMSI according to a first embodiment.

FIG. 8 illustrates a successful location update procedure in which the subscriber uses the IMSI for identification. When the subscriber provides the IMSI for identification, the new VLR sends a MAP UPDATE LOCATION indication message (including the new revision management parameter) to the HLR. The HLR determines whether the subscriber profile in the new VLR needs updating. This determination may be made by comparing the revision management parameter (e.g., the time stamp or version number) received in the MAP UPDATE LOCATION indication message from the new VLR with the revision management parameter (e.g., the time stamp or version number) associated with the subscriber profile stored in the HLR from the concerned subscriber. If the revision management parameters are the same, this indicates that the subscriber profiles are the same, and no update is deemed necessary. On the other hand, if the revision management parameters do not match, the subscriber profile in the new VLR needs to be update. In this case, the HLR indicates, using a new parameter in the MAP UPDATE LOCATION response message, to the new VLR that it can retrieve the updated subscriber profile from the previous VLR. Before instructing the new VLR to do this, the HLR confirms that the conditions for updating the subscriber profile are met, e.g., that the previous VLR is using the Super-Charger concept, that the previous VLR is located in the same PLMN (or same country) as the new VLR, and that the subscriber profile has not been updated since the subscriber left the area served by the previous VLR. This means that the HLR must retain the revision management parameter, e.g., time stamp, sequence number, etc. of the last subscriber profile revision. The new VLR may then retrieve the updated subscriber profile from the previous VLR using a new MAP service, i.e., new messages. The new messages may be called, e.g., MAP SUBSCRIBER DATA TRANSFER request (for requesting the subscriber profile from the previous VLR) and MAP SUBSCRIBER DATA TRANSFER response (for returning the subscriber profile to the new VLR). The response message may be a single message or multiple messages, depending on the amount of data to be transferred.

If this retrieval fails, the new VLR can still retrieve an updated subscriber profile from the HLR by initiating a MAP RESTORE DATA procedure (for the concerned subscriber) towards the HLR or by initiating a new MAP UPDATE LOCATION dialog with the HLR. If a new MAP UPDATE LOCATION indication message is sent to the HLR, it should not include the revision management parameter this time in order to trigger a normal MAP INSERT SUBSCRIBER DATA procedure (without inclusion of the revision management parameter) from the HLR. An alternative is to have an explicit indication in the MAP UPDATE LOCATION indication message, possibly a special value of the revision management parameter, indicating that both the subscriber profile and its associated revision management parameter should be transferred from the HLR.

If, upon reception of the first MAP UPDATE LOCATION message (including the revision management parameter), the HLR determines that the subscriber profile in the new VLR needs to be updated, but that the conditions for subscriber profile retrieval from the previous VLR are not fulfilled, the HLR initiates the MAP INSERT SUBSCRIBER DATA procedure (and includes the revision management parameter together with the subscriber profile in the ISD message(s)) towards the new VLR before the MAP UPDATE LOCATION response message is sent (i.e., just as in a location update procedure in the currently proposed Super-Charger concept).

Figure 9:
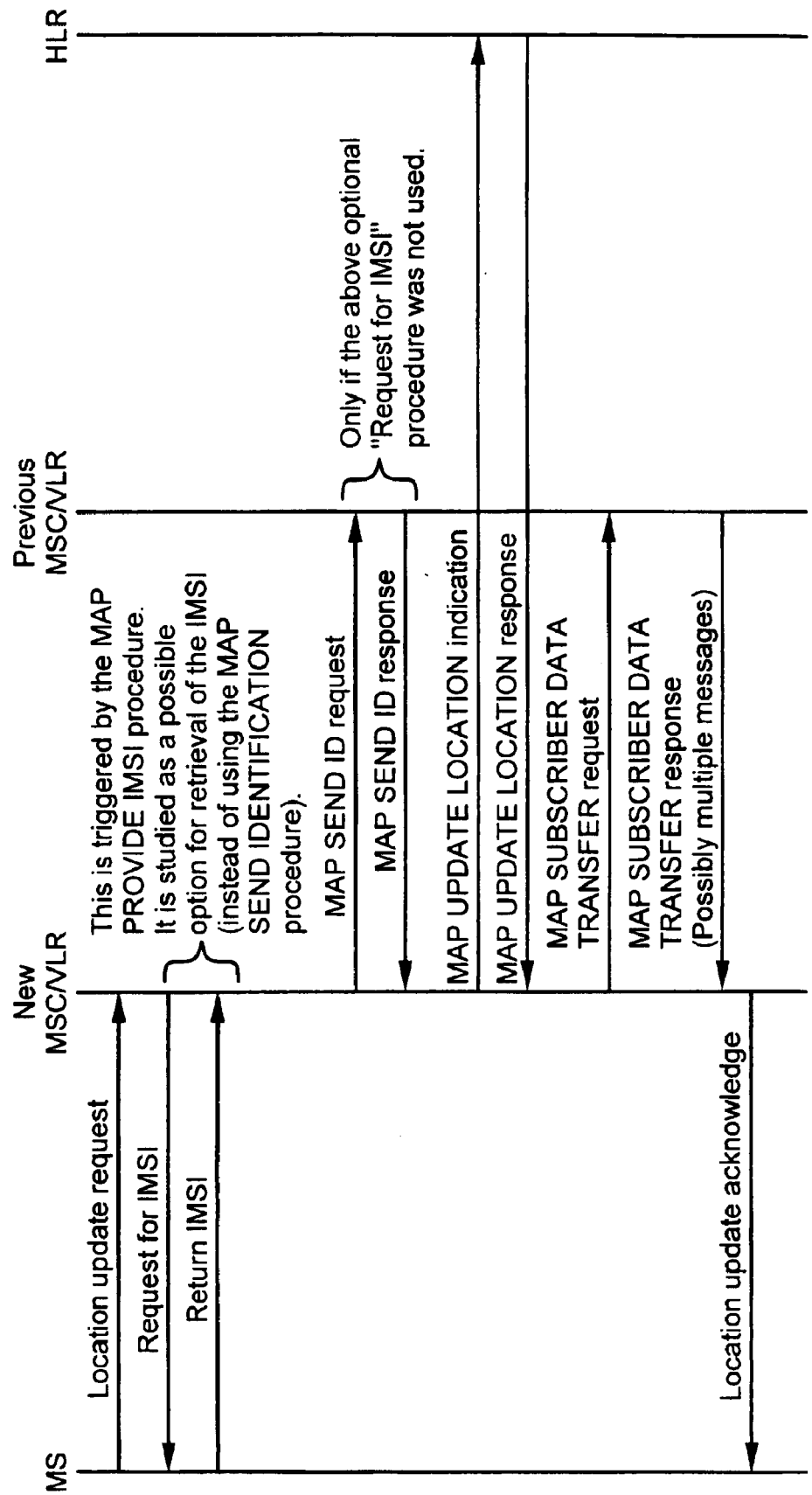
FIGS. 9 and 10 illustrate signalling sequences for successful location update procedures when the subscriber identifies himself with the TMSI according to a first embodiment.

FIG. 9 illustrates a successful location update procedure in which the subscriber uses the TMSI for identification, and the new VLR retrieves the IMSI from the previous VLR in the standard GSM manner (via the MAP SEND IDENTIFICATION service), or from the MS (via the MAP PROVIDE IMSI service). For the case to be successful, the HLR must determine that the conditions for subscriber profile retrieval from the previous VLR are fulfilled.

As shown in FIG. 9, the new VLR sends the MAP UPDATE LOCATION indication message to the HLR, and the procedure continues in the same manner as in the case when the subscriber used the IMSI for identification.

Figure 10:
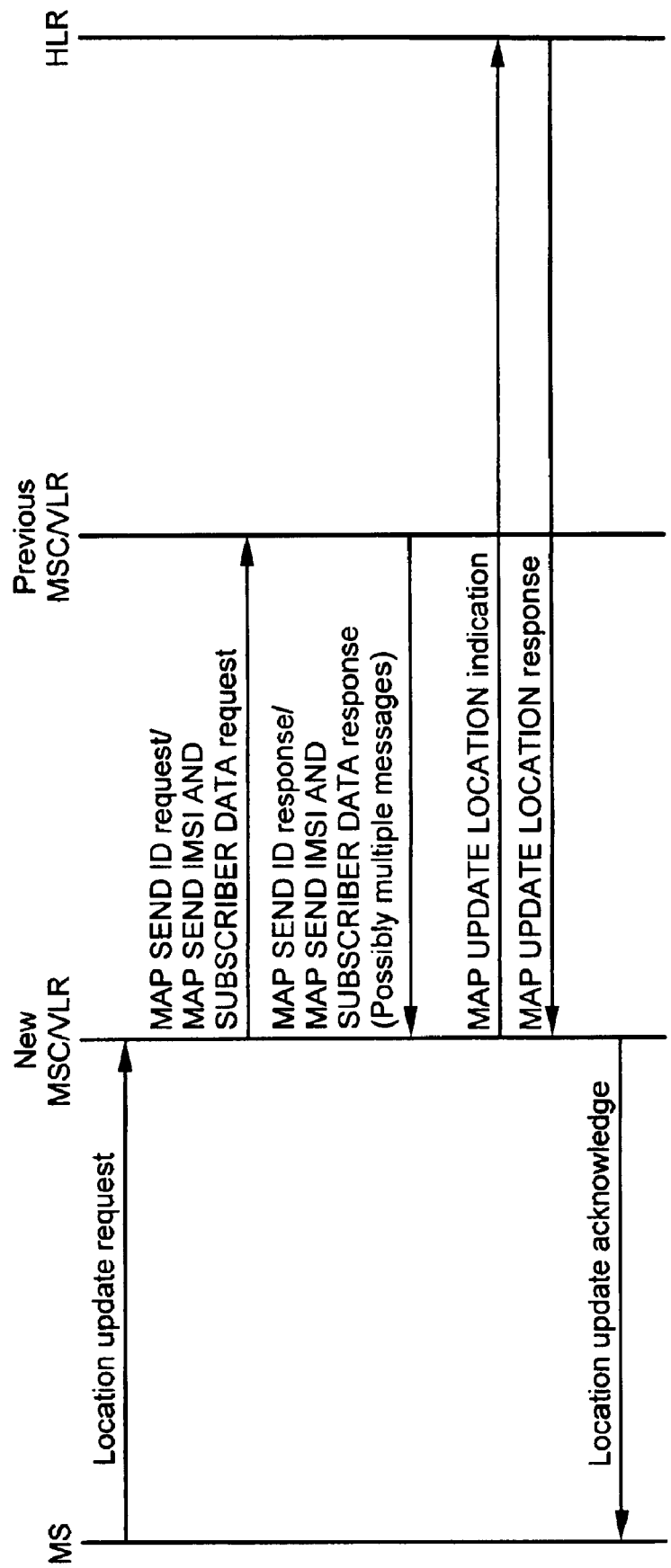

According to another alternative, the new VLR retrieves the subscriber profile, together with the IMSI, from the previous VLR. FIG. 10 illustrates a signalling sequence of this alternative when the subscriber identifies himself with the TMSI. In the MAP SEND IDENTIFICATION request message, the new VLR, after determining that the previous VLR is located in the same PLMN or in the same country, includes the subscriber profile revision management parameter (e.g., time stamp, sequence number, etc.) associated with the subscriber profile version already stored in the new VLR.

As shown in FIG. 10, the previous VLR compares the received revision management parameter with the one associated with the subscriber profile version stored in its own database, and if the previous VLR determines that the subscriber profile stored in the new VLR needs to be updated, the previous VLR includes its own revision of the subscriber profile and the corresponding revision management parameter together with the IMSI (and possible authentication triplets) in the MAP SEND IDENTIFICATION response message. This, of course, means that the formats of the MAP SEND IDENTIFICATION messages have to be modified. It would also be possible to design new MAP messages for this procedure. The new messages may be called, e.g., MAP SEND IMSI AND SUBSCRIBER DATA request and MAP SEND IMSI AND SUBSCRIBER DATA response. If necessary, the previous VLR may use several messages to transfer all the subscriber data. If the subscriber profile does not need to be updated, the previous VLR simply omits the subscriber profile in its response message.

The new VLR replaces its previously stored subscriber profile version with the one (if any) received from the previous VLR. It then sends a MAP UPDATE LOCATION indication message to the HLR including the revision management parameter it received from the previous VLR.

There is, at this point, a small risk that the subscriber profile was modified in the HLR since the subscriber left the area served by the previous VLR or since the subscriber profile was retrieved from the previous VLR. In such a case, after determining from the received revision management parameter that the subscriber profile in the new VLR needs to be updated, the HLR sends the updated subscriber profile in one or several MAP INSERT SUBSCRIBER DATA messages, and the transfer of the subscriber profile between the VLRs will have been in vain. However, in the vast majority of cases, the HLR determines that the subscriber profile in the new VLR does not need to be updated, and then the transfer of the subscriber profile over international signaling links is avoided.

If the new VLR fails for some reason to retrieve the updated subscriber profile from the previous VLR, it will simply include its previously retained revision management parameter in the MAP UPDATE LOCATION indication message to the HLR, and the HLR will act as described above.

Although not illustrated, similar methods can be used for updating a subscriber profile in a new SGSN using the subscriber profile stored in the previous SGSN.

Figure 11:
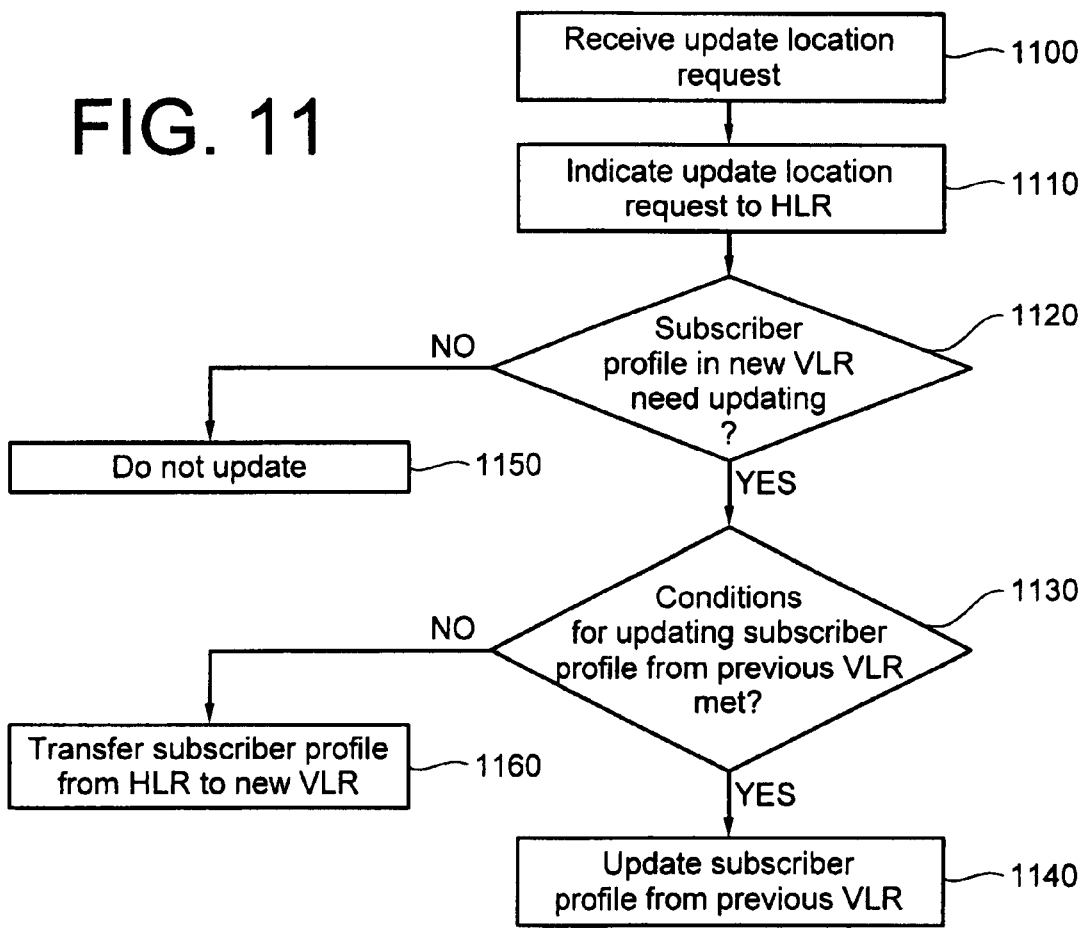
FIG. 11 illustrates a method for handling subscriber data according to a first embodiment.

FIG. 11 illustrates an exemplary method for handling subscriber data according to the first embodiment. The method beings at step 1100 at which a request for a location update is received at the new VLR. At step 1110, the new VLR indicates the update location request to the HLR. At step 1120, a determination is made, e.g., by the HLR, whether the subscriber profile in the new VLR needs updating. If so, at step 1130, a determination is made, e.g., by the HLR, whether the conditions for updating the subscriber profile in the new VLR from the previous VLR are met, e.g., whether the previous VLR is using the Super-Charger concept, whether the new VLR is located in the same PLMN or same country as the previous VLR and whether the subscriber profile has been updated since the subscriber left the previous VLR. It will be appreciated that steps 1120 and 1130 may be performed in the reverse order by the new VLR and the previous VLR, respectively, e.g., the new VLR may determine if the conditions for updating the subscriber profile are met, and the previous VLR may determine whether the subscriber profile needs updating.

If the subscriber profile is determined to need updating and the conditions for updating are met, the subscriber profile is updated at step 1140, e.g., by the previous VLR sending the subscriber profile to the new VLR. If, at step 1120, it is determined that the subscriber profile does not need updating, at step 1150, the profile is not updated. If, at step 1130, it is determined that the conditions for updating the profile from the previous VLRS are not met, at step 1160 the subscriber profile is transferred from the HLR to the new VLR.

According to this embodiment, by retrieving the updated subscriber profile from the previous VLR instead of the HLR, the international signaling caused by location update procedures can be significantly reduced in the cases when the subscriber is roaming in another PLMN and the previous VLR is located in the same PLMN (or in the same country) as the new VLR. This is a significant improvement of the Super-Charger concept.

Rather than updating an entire subscriber profile, it may be sufficient to update an existing profile with modifications that have been made in the profile, since the last update. According to a second embodiment, a technique is provided for updating a subscriber profile only with modifications made to the profile since the last update.

In the following description, the use of the MAP INSERT SUBSCRIBER DATA and the MAP DELETE SUBSCRIBER DATA messages is described. These messages can be used between the HLR and the VLR or between the HLR and the SGSN. The procedures used between the HLR and the VLR and the procedures used between the HLR and the SGSN are identical, although the message parameters may differ. The invention is equally applicable in both cases.

In the current GSM system, no subscriber data is retained in a VLR or a SGSN after the subscriber leaves the service area of the VLR or the SGSN. Therefore, a reception of a MAP INSERT SUBSCRIBER DATA message in the VLR or the SGSN means that the data is simply copied from the ISD message(s) to the VLR database or the SGSN database.

In the stand alone subscriber data case, i.e., when one or more ISD message(s) are sent to the current VLR or the current SGSN because the subscriber profile has been updated in the HLR, the parameters received in the ISD message(s) overwrite the corresponding parameters previously stored in the VLR or the SGSN. If there are parameters stored in the VLR or the SGSN for which no corresponding parameters are included in the ISD message(s), these previously stored parameters are retained in the VLR or the SGSN. To delete parameters in the subscriber profile stored in the VLR or the SGSN, the HLR has to use the MAP DELETE SUBSCRIBER DATA message.

Since every modification of the subscriber profile needs to be reflected in the current VLR or the current SGSN, i.e., the HLR does not accumulate modifications before informing the current VLR and/or SGSN, it is unlikely that both a MAP INSERT SUBSCRIBER DATA message and a MAP DELETE SUBSCRIBER DATA message would have to be used to reflect a subscriber profile modification. In almost all cases, either one of them would be sufficient.

In contrast, in a Super-Charged network, a MAP INSERT SUBSCRIBER DATA indication message received during the location update procedure or the GPRS Attach procedure or the Routing Area Update procedure results in the received data being entirely copied into the VLR database or the SGSN database, i.e., the previously retained subscriber profile is entirely deleted and the received subscriber profile is stored in its place. None of the previously stored parameters of the subscriber profile are retained, even if there is no corresponding parameter present in the MAP INSERT SUBSCRIBER DATA indication message(s). This results in a waste of the signaling resources that the Super-Charger concept aims to save.

In many cases, only a small part of the subscriber profile is changed. Therefore, sending the entire subscriber profile from the HLR is a waste of signaling resources. It would be better if only the modifications, e.g., a "delta subscriber data message", was sent.

It may be possible to use the principles of the stand alone subscriber data management procedures to indicate modifications of the subscriber profile. However, in a network supporting the Super-Charger concept, the difference between the subscriber profile retained in the VLR or the SGSN (in which a subscriber is trying to register) and the updated subscriber profile in the HLR may be the result of several modifications of the subscriber profile in the HLR. Therefore, the principles of the stand alone subscriber data management procedures as described above may not be appropriate for indicating the subscriber profile modifications during a location update procedure or a GPRS Attach procedure or a Routing Area Update procedure using the Super-Charger concept. In many cases, both a MAP INSERT SUBSCRIBER DATA message and a DELETE SUBSCRIBER DATA message would have to be sent.

According to an exemplary embodiment, a "delta subscriber data message" may be used to indicate modifications. This message may include both the modified parameters and the new parameters, a list of the parameters to be deleted, and the revision management parameter associated with the updated subscriber profile. All of this information may be sent in a single message that is much shorter than the one or more ISD messages. Possible names for such a new message and the appropriate response may be, e.g., MAP SUBSCRIBER DATA MODIFICATION indication and MAP SUBSCRIBER DATA MODIFICATION response. This new MAP message improves the efficiency of the Super-Charger concept. In extreme cases, the "delta subscriber data message" may need to be sent as multiple messages, if the amount of data that needs to be transferred is very large due to, e.g., extensive modifications of the subscriber profile.

Upon reception of one or more "delta subscriber data messages" from the HLR, the VLR or the SGSN uses the modification indications received in the message(s) to update the previously stored version of the subscriber profile to reflect the version of the subscriber profile currently stored in the HLR. The VLR or the SGSN then replaces the previously stored revision management parameter with the revision management parameter received from the HLR.

For this to work, the HLR must keep track of at least the latest modifications of the subscriber profile. As long as all the modifications between the version of the subscriber profile retained in the VLR or the SGSN and the version stored in the HLR are recorded, the "delta subscriber data message" may be used. Otherwise, the complete subscriber profile has be transferred together with the revision management parameter, just as in the currently proposed Super-Charger concept.

It would, of course, also be possible to use the new messages for the stand alone subscriber data management cases.

This embodiment may be understood by the following example, with reference to FIGS. 12A–F, which illustrates different versions of an exemplary subscriber profile, FIGS. 13A–E, which illustrate exemplary modification records, and FIG. 14, which illustrates an exemplary delta subscriber data message.

Assume that the letters A–Z of the alphabet are used as the set of parameters that may appear in a subscriber profile, these parameters representing, e.g., services. Different subscriber profiles will contain different subset of these 26 parameters, and some subscriber profiles may even contain all of these parameters, depending, e.g, on what services a subscriber subscribes to.

Each parameter has a certain value, which may vary from profile to profile. Some of the parameters may have an internal data structure.

Assume that a subscriber with the IMSI "imsi-X" has a subscriber profile that contains 10 parameters. Further, assume that the revision management parameter is a simple sequence number, which is sequentially updated for each version of the subscriber profile. Assuming that the current version of the "imsi-X" subscriber profile is 6, an exemplary subscriber profile is shown in FIG. 12A.

Now assume that the subscriber profile is modified by adding a new parameter S with the value 4 to the profile, e.g., because a service subscription is changed. FIG. 13A illustrates what the resulting modification record may look like.

FIG. 12B illustrates a subscriber profile (version 7) with the modifications made according to the modification record shown in FIG. 13A. The old subscriber profile (version 6) is not stored, but the modification record is stored.

Assume that, next, a new parameter D is added with the value 5 is added to the profile, and the value of the parameter G is changed to 8. A new modification record is added to the modification table to reflect these changes, as shown in FIG. 13B. FIG. 12C illustrates the resulting subscriber profile (version 8).

Next, assume that the parameter G is deleted, and the value of parameter P is changed to 7. Again, a new modification record is added to the modification table, as shown in FIG. 13C. The resulting subscriber profile (version 9) is shown in FIG. 12D.

Next, assume that the parameter S is deleted. An appropriate modification record is added to the modification table, as shown in FIG. 13D. The resulting subscriber profile (version 10) appears in FIG. 12E.

Assume that a new parameter W, with the value 6, is then added. Now, assume that the HLR only saves modifications records for four versions. This means that the content of the modification records are now shifted one step to the left in the table. The result is that the contents of record 1 are remove from the table, and the data reflecting the most recent modifications is put into record 4. The modification table resulting is shown in FIG. 13E. FIG. 12F shows the resulting subscriber profile (version 11).

Continuing this subscriber profile modification scenario, now assume that a MAP UPDATE LOCATION Request message concerning the subscriber with the IMSI "imsi-X" is received from a VLR. The message includes a revision management parameter, so the VLR apparently supports the Super-Charger concept, indicating that the subscriber profile version stored in the VLR has revision number 7.

It is very easy for the HLR to determine whether the recorded modifications are sufficient to created a "delta subscriber data message" for updating the subscriber profile version in the VLR to the one stored in the HLR. The modification table described above allows the HLR to back-track changes to the profile versions and makes it possible to accumulate modifications from up to four versions back. Hence, if the current subscriber profile version number in the HLR is denoted "C", then a "delta subscriber data message" can be used if the version number of the subscriber profile version in the VLR, denoted V, is in the range C–4 through C–1, i.e., if C–4≦V≦ C–1. The case when V=C is trivial, since this means that the subscriber profile in the VLR does not need to be updated, and neither a delta subscriber data message nor a MAP INSERT SUBSCRIBER DATA message has to be send. In our example, C=11 and V=7=C–4. Thus, a "delta subscriber data message" can be used to update the subscriber profile version in the VLR.

To build a "delta subscriber data message" indicating that modifications required to update the subscribe profile from version 7 to version 11, the HLR has to accumulate the modifications in the modification table and put the resulting accumulated modifications in the message. The "delta subscriber data message" in this example would then have the contents illustrated in FIG. 14, in which the new parameters and the modified parameters are included in a "new or modified" parameters class. When this message is received in the VLR, the VLR extracts the modifications from the message, modifies its subscriber profile version, accordingly, and replaces the revision management parameter.

Figure 15:
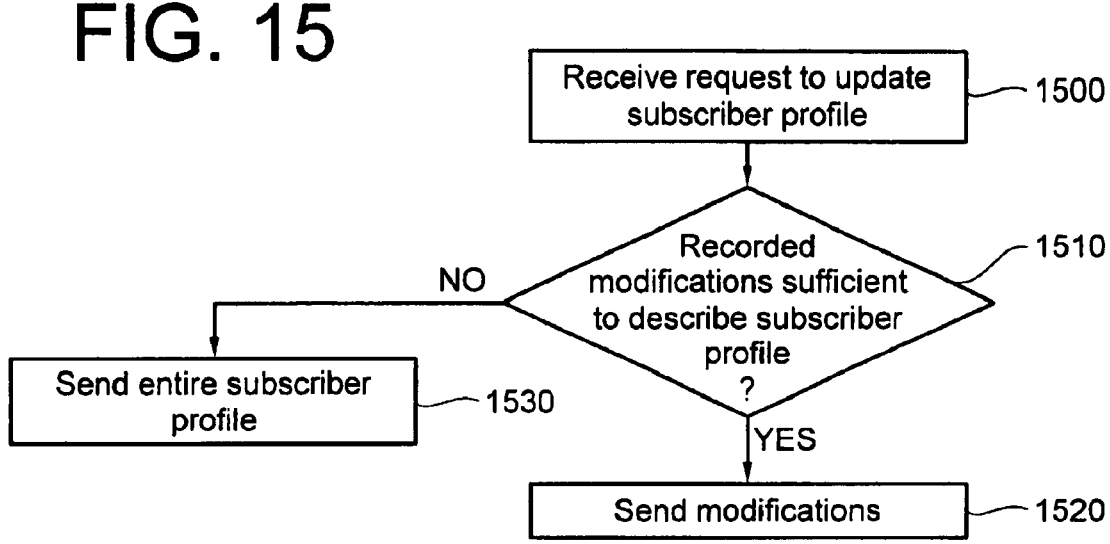
FIG. 15 illustrates a method for handling subscriber data according to a second embodiment.

FIG. 15 illustrates an exemplary method for handling subscriber data according to the second embodiment. The method begins at step 1500 at which a request for updating a subscriber profile is received in the HLR. This request may be received, e.g., during a location update procedure, a GPRS Attach procedure, or a Routing Area Update Procedure. At step 1510, a determination is made, e.g, by the HLR, whether the modifications recorded in the HLR are sufficient to describe the differences between the version of the subscriber profile stored in the VLR or SGSN and the version currently stored in the HLR. This determination may be made by comparing the version numbers of the profiles and determining whether the version number of the profile in the VLR is within a predetermined range of the version number of the profile stored in the HLR. If the modifications are sufficient, e.g., if the version number of the profile stored in the VLR is within the predetermined range of the version number of the profile stored in the HLR, at step 1520, the modifications are sent by the HLR in a "delta subscriber data message". If the recorded modifications are not sufficient, e.g., if the version number of the profile stored in the VLR is outside the predetermined range from the version of the profile stored in the HLR, the entire subscriber profile is sent by the HLR at step 1530.

According to this embodiment, by sending only the modifications of the subscriber profile from the HLR to the VLR during a location update procedure or to the SGSN during a GPRS Attach procedure or a Routing Area Update procedure using the Super-Charger concept, the amount of signaling data is significantly reduced compared to the currently proposed Super-Charger concept.

While these embodiments address the reduction of signalling data, making the Super-Charger concept more efficient, there remains the problem of TMSI/P-TMSI unallocation and ambiguity.

According to a third embodiment, the problems of the TMSI/P-TMSI unallocation described above are addressed. According to one aspect of this embodiment, in the vast majority of the cases (when the subscriber identifies himself with the TMSI in the location update request or the P-TMSI in the GPRS Attach request or the Routing Area Update request), a reception of a MAP SEND IDENTIFICATION request message in the previous VLR or the reception of an Identification Request message or a SGSN Context Request message in the previous SGSN has the same effect as a MAP CANCEL LOCATION message (except that the subscriber profile is retained according to the Super-Charger concept of course), i.e., the TMSI/P-TMSI of the concerned subscriber is unallocated.

Figure 16A:
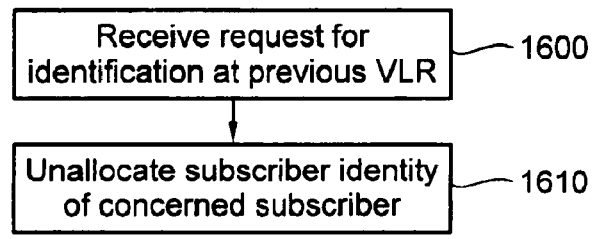
FIGS. 16A and 16B illustrate methods for handling subscriber data according to a third embodiment.

FIG. 16A illustrates a method for handling subscriber data according to this aspect. The method begins at step 1600 at which a request for subscriber identification is received at a previous VLR or SGSN serving an area from which the subscriber has roamed. At step 1610, the subscriber identity of the concerned subscriber is unallocated by the previous VLR or SGSN.

To cover the remaining small minority of the cases (or all of the cases in the non-GPRS case if the MAP SEND identification message is removed), another mechanism is also needed as a backup. Thus, according to another aspect, a TMSI/P-TMSI may be made valid for only a certain specified period of time, e.g., "T", after the last contact between the MS and the network. This means that if the time T has elapsed since the last contact with the network, the MS is not allowed to use the TMSI/P-TMSI to identify itself to the network in a subsequent access attempt and should not respond to subsequent page messages including the TMSI/P-TMSI. In other words, after the time T since the last contact with the MS, the TMSI/P-TMSI is deleted in the MS. To allow for some timer discrepancy, the network does not unallocate the TMSI/P-TMSI until the time T+δ (where δ is a small fraction of T) has elapsed since the last contact with the MS. The network does not use the TMSI/P-TMSI in a page message between the times T−δ and T+δ since the last contact with the MS.

Even though the TMSI and the P-TMSI parameters were treated together in the above paragraphs, there may be one pair of timing parameters for the TMSI and one for the P-TMSI, e.g., $T_{TMSI}$ and $\delta_{TMSI}$, and $T_{PTMSI}$ and $\delta_{P-TMSI}$, and these need not have the same values.

As an example, T may be 48 hours, and δ, may be 2 hours. Other exemplary values for T may be 24 hours or 72 hours, and other exemplary values for δ, may be 1 hour or 3 hours.

The values of the parameters T and δ, whether they are the same or different for the TMSI and the P-TMSI, respectively, may be standardized and hard coded or may be specified as being part of the system information broadcast in every cell, thereby leaving the choice of the exact values to each operator. The latter method makes it possible to have different parameter values not only in different PLMNs but also in different location areas within the same PLMN (for the TMSI) and in different SGSN service areas within the same PLMN (for the P-TMSI). This provides some flexibility to the operators, which may be useful since different operators may have different coding schemes for the TMSI parameter and possibly also for the P-TMSI parameter. Broadcasting the parameter values as system information also makes it possible to have different parameter values for the TMSI (which is unique within one location area) in different location areas within the same PLMN. For the P-TMSI, which is unique within the service area of a SGSN, it would be possible to have different parameter values in different SGSN service areas within the same PLMN. This may be useful feature since, e.g., in location areas where there are normally many, e.g., more than average subscribers registered simultaneously, reusing of TMSI values is more important, and therefore the parameter T (and consequently also the δ parameter) should be set to a smaller value than in location areas where there are normally few subscribers registered simultaneously.

Figure 16B:
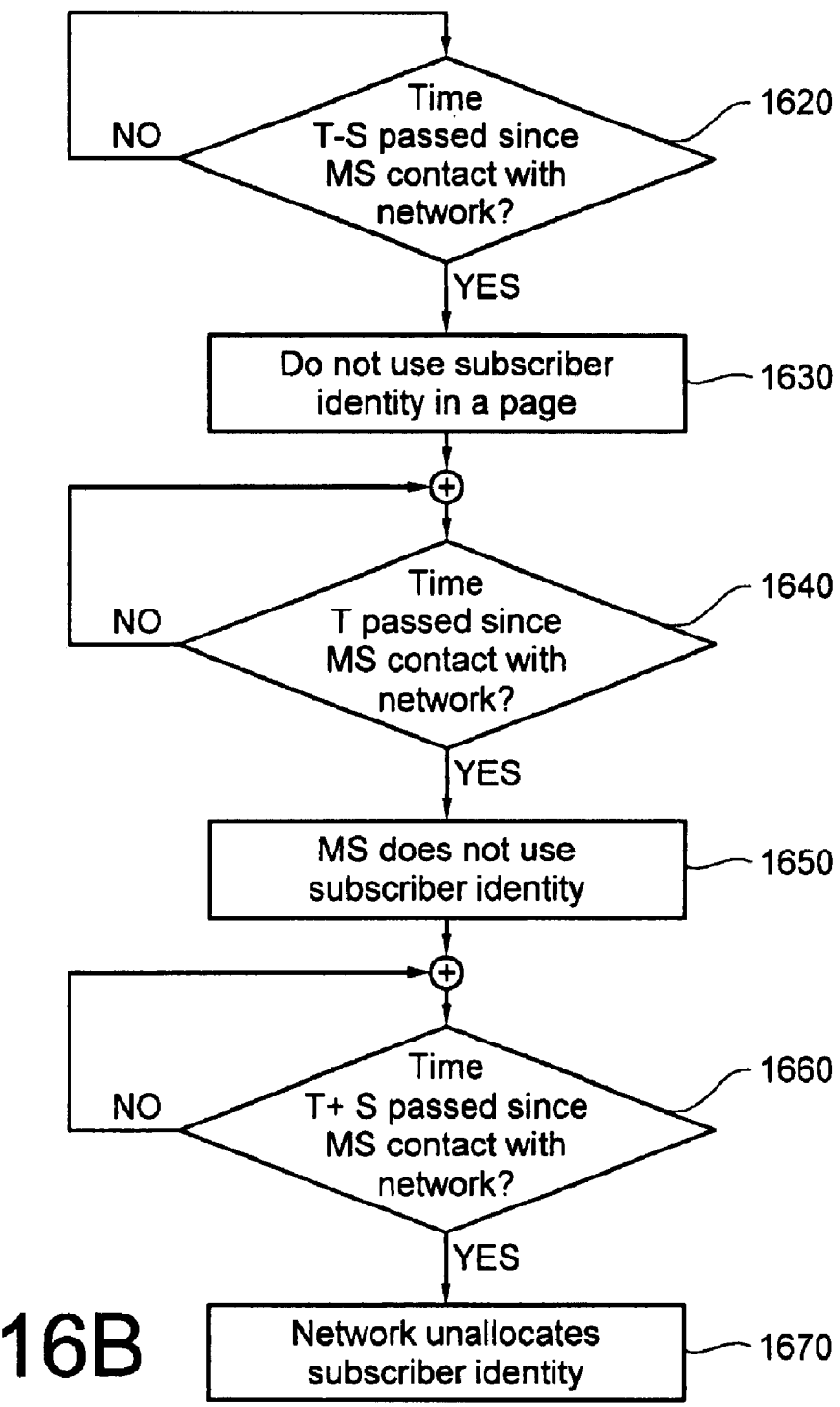

FIG. 16B illustrates a method for handling subscriber data according to this aspect. The method begins at step 1620 at which a determination is made, e.g., by the HLR, whether a time T−δ has passed since the last contact of the MS with the network. If not, step 1620 is repeated. If time T−δ has passed, the network does not use the TMSI/P-TMSI for paging at step 1630. Then, at step 1640, a determination is made, e.g., by the HLR, whether the time T has passed since the last contact of the MS with the network. If not, the process returns to step 1640. If time T has passed, the TMSI/PTMSI is not used by the MS anymore at step 1650. Next, at step 1660, a determination is made, e.g., by the HLR, whether the time T+δ has passed since the last contact of the MS with the network. If not, the process returns to step 1660. If time T+δ has passed, the TMSI/P-TMSI is unallocated by the network at step 1670.

According to this embodiment, the TMSI/P-TMSI problems associated with the Super-Charger concept (i.e., decreased, efficiency of TMSI/P-TMSI management and TMSI/P-TMSI ambiguity problems) are solved. The unallocation of the TMSI/P-TMSI may be achieved in a controlled manner and within a reasonable time. Also, by letting the timing principle apply even when a subscriber record is discarded from the VLR or the SGSN by the Super-Charger database management function, the TMSI/P-TMSI ambiguity problem in conjunction with the removed MAP PURGE MS message is also solved. A drawback of this technique is that the MS may sometimes have to identify itself with the IMSI (or may have to be paged with the IMSI), when, if the time limit were not used, the TMSI or the P-TMSI might otherwise have been used. Thereby, the usefulness of the TMSI/P-TMSI is somewhat reduced, though probably marginally, depending on the value chosen for the time limit T.

The embodiments described above address various problems of the Super-Charger concept. Another problem with the Super-Charger concept arises in connection with PDP context activation.

Figure 6:
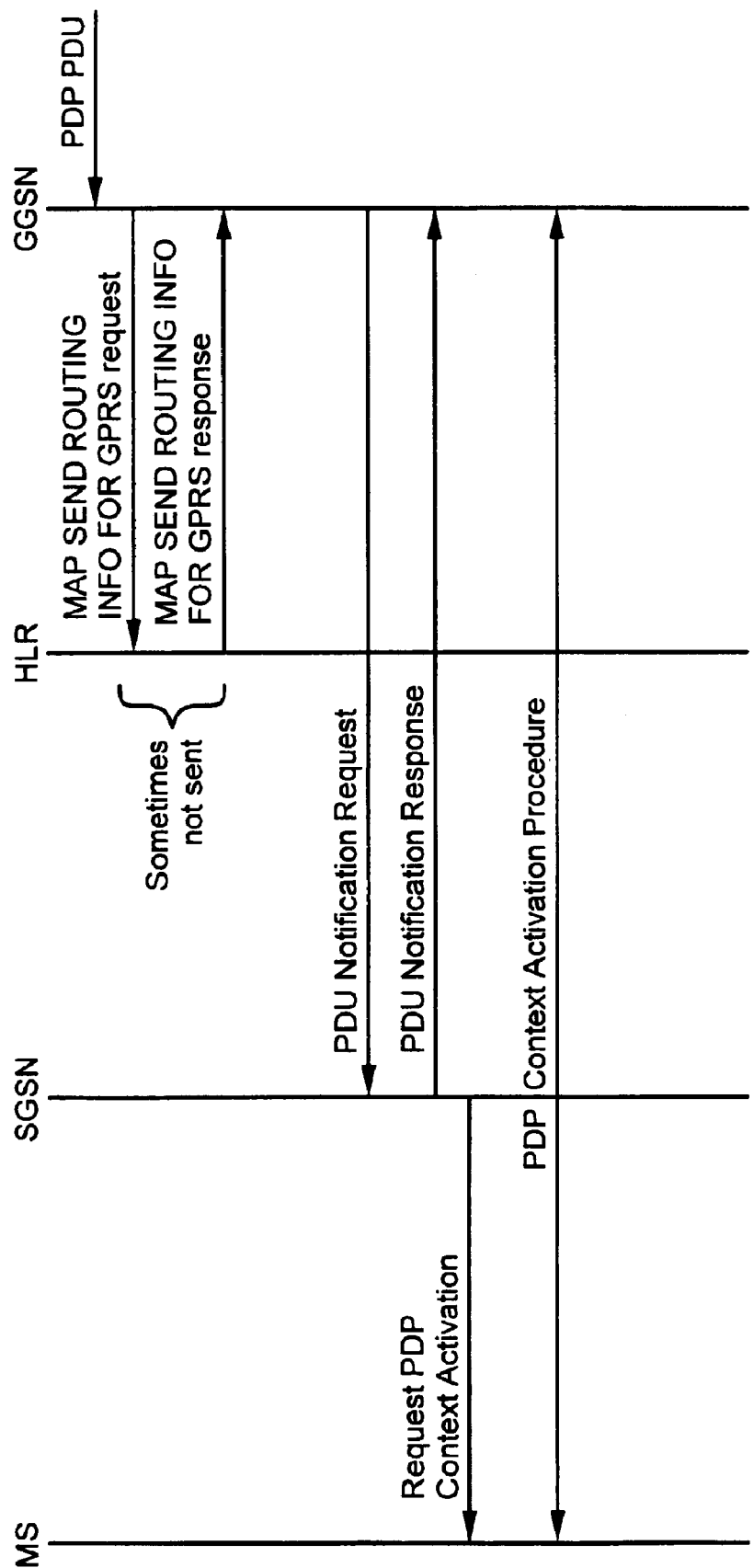
FIG. 6 illustrates a typical signalling sequence for the successful case of a network-requested PDP context activation.
Figure 7:
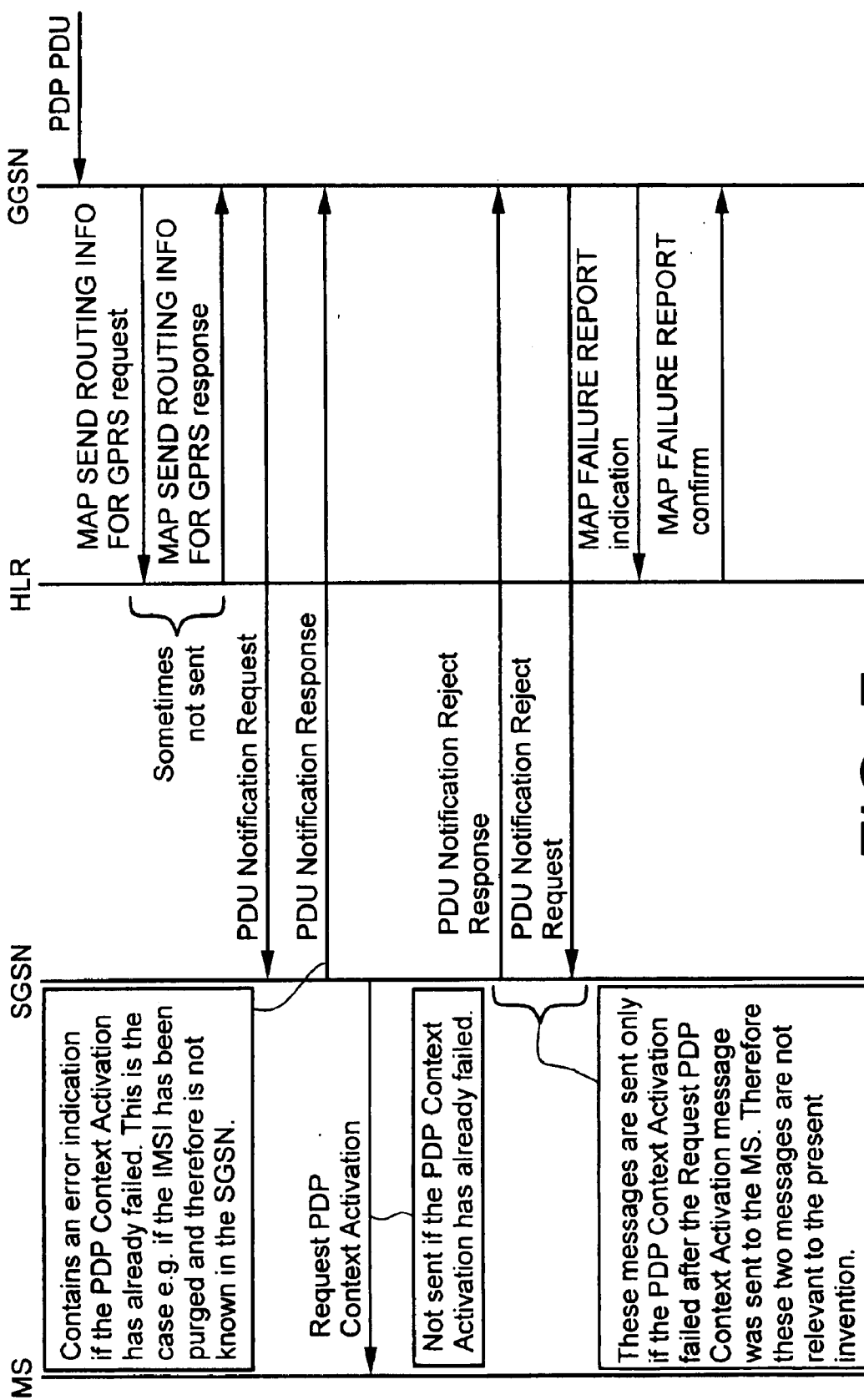
FIG. 7 illustrates a typical signalling sequence for the unsuccessful case of a network-requested PDP context activation.

The procedures described below ensure that an unsuccessful network requested PDP context activation for a subscriber, whose record has been discarded from the SGSN by the Super-Charger database management function, results in that the "MS Purged for GPRS" flag is set for the concerned subscriber in the HLR. To aid in understanding, reference may be made to FIGS. 6 and 7.

Upon reception of a PDU Notification Request message concerning a subscriber whose record has been discarded from the SGSN by the Super-Charger database management function, the SGSN returns to the GGSN a PDU Notification Response message including an error indication with the new cause value "MS Purged" or "MS Purged for GPRS". The error indication may also be in the form of a User Error parameter indicating the new "Absent Subscriber GPRS" error with the diagnostic information "MS Purged" or "MS Purged for GPRS".

The GGSN then reports the failure to the HLR with a MAP FAILURE REPORT indication message including the user error parameter with the new value "MS Purged" or "MS Purged for GPRS" or with the new value "Absent Subscriber GPRS" with the diagnostic information "MS Purged" or "MS Purged for GPRS".

As an alternative, a new parameter may be included in the MAP FAILURE REPORT indication message, indicating that the concerned IMSI had been purged in the SGSN. In order for the HLR to be able to check whether the concerned subscriber was purged from the SGSN that is currently stored in the subscriber record of the HLR, the SGSN Address (of the SGSN returning the PDU Notification Response message to the GGSN) may be included in the MAP FAILURE REPORT indication message. This may be a mandatory parameter or a parameter included only when a "MS Purged" or "MS Purged for GPRS" indication of any kind is reported.

Upon reception of the error indication (conveying the information that the MS had been purged in the SGSN) in the MAP FAILURE REPORT indication message, the HLR sets the "MS Purged for GPRS" flag for the concerned subscriber (provided that the SGSN Address received in the MAP FAILURE REPORT indication message is the same as the SGSN Address currently stored for the concerned subscriber in the HLR). The HLR also sets the MNRG flag for the concerned subscriber and may also set the MNRR parameter in the subscriber record to the new value "MS Purged for GPRS", "MS Purged" or "MS Purged for Non-GPRS or GPRS". The HLR then confirms the reported failure with the MAP FAILURE REPORT confirm message to the GGSN. The GGSN may also set a MNRG flag for the concerned subscriber.

Through the above described procedure, the "MS Purged for GPRS" flag is set for a subscriber whose subscriber record has been discarded by the Super-Charger database management function in the SGSN and for which a network requested PDP context activation, in preparation for transfer of mobile terminated GPRS data packets, has just failed.

Figure 17:
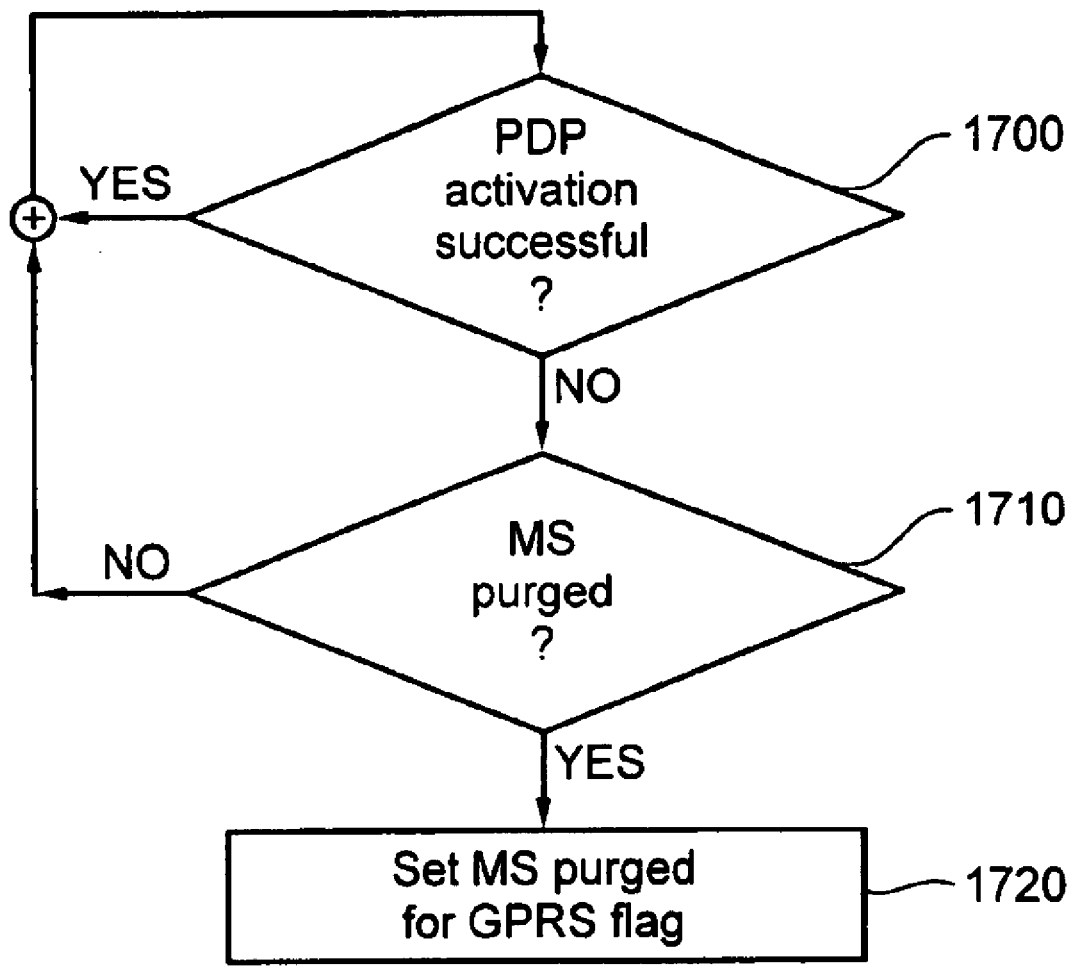
FIG. 17 illustrates a method for handling subscriber dat according to a fourth embodiment.

FIG. 17 illustrates a method for handling subscriber data according to the fourth embodiment. The method begins at step 1700 at which a determination is made whether PDP activation is successful. If not, a determination is made at step 1710 by the HLR whether the MS record was purged. This determination may made based, e.g., on error messages from the SGSN, as confirmed with the GGSN. If the HLR determines that the MS record was purged, the HLR sets the MS Purged for GPRS flag is set at step 1720. Otherwise, the process returns to step 1700.

According to this embodiment, an unsuccessful network requested PDP context activation for a subscriber, whose record has been discarded from the SGSN by the Super-Charger database management function, results in that an "MS Purged for GPRS-indication" is set for the concerned subscriber in the HLR. Hence, subsequent network-requested PDP context activation attempts (i.e., attempts to deliver mobile terminated GPRS data packets) or short message deliver attempts to the concerned subscriber are prevented.

According to exemplary embodiments, methods are provided for handling subscriber data. The proposed techniques impose only minor modifications of the current GSM MAP (GSM TS 09.02) or the currently proposed Super-Charger concept.

It will be appreciated by those of ordinary skill in the art that this invention can be embodied in other specific forms without departing from its essential character. The embodiments described above should therefore be considered in all respects to be illustrative and not restrictive.

We claim:

1. A method for handling subscriber data for a subscriber roaming in a network including a home network entity containing information regarding subscribers to the network and one or more visitor network entities containing information regarding subscribers to one or more other networks, the method comprising:

receiving an update location request at a new visitor network entity serving an area into which the subscriber roamed from an area served by a previous visitor network entity;

indicating the update location request to the home network entity;

determining whether a subscriber profile of the subscriber stored in the new visitor network entity needs updating;

determining whether conditions for updating the subscriber profile stored in the new visitor network entity from the previous visitor network entity are met; and if the subscriber profile needs updating and the conditions are met, updating the subscriber profile stored in the new visitor network entity from the previous visitor network entity.

2. The method of claim 1, wherein the step of determining whether the subscriber profile needs updating comprises comparing in the home network entity a version parameter indicating a version of the subscriber profile stored in the new visitor network entity with a version parameter indicating a version of the subscriber profile stored in the home network entity.

3. The method of claim 1, wherein the step of determining whether the conditions for updating the subscriber profile in the new visitor network entity from the previous visitor network entity are met includes determining whether the previous visitor network entity is located in the same Public Land Mobile Network (PLMN) or in the same country as the new visitor network entity.

4. The method of claim 3, wherein this determination is made in the home network entity.

5. The method of claim 3, wherein this determination is made in the new visitor network entity.

6. The method of claim 5, further comprising sending to the previous visitor network entity a message requesting the transfer of a newer subscriber profile.

7. The method of claim 1, further comprising sending from the home network entity an update location response to the new visitor network entity indicating that the updated subscriber profile should be retrieved from the previous visitor network entity.

8. The method of claim 7, further comprising sending from the new visitor network entity a message to the previous visitor network entity requesting the updated subscriber profile to be transferred to the new visitor network entity.

9. The method of claim 8, further comprising returning from the previous visitor network entity the updated subscriber profile in one or several response message (s).

10. The method of claim 8, further comprising, if the subscriber profile cannot be retrieved from the previous visitor network entity, sending to the home network entity a restore message including the identity of the concerned subscriber.

11. The method of claim 8, wherein the message includes an explicit indication that the subscriber profile and its associated revision management parameter should be sent from the home network entity to the new visitor network entity.

12. The method of claim 1, wherein the step of determining whether the subscriber profile needs to be updated comprises comparing in the previous visitor network entity a version parameter indicating a version of the subscribe profile stored in the new visitor network entity with a version parameter indicating the version of the subscriber profile currently stored in the previous visitor network entity.

13. The method of claim 1, wherein the step of updating comprises sending from the previous visitor network entity to the new visitor network entity the newer subscriber profile and its associated version parameter in one or more response messages.

14. The method of claim 13, further comprising, upon reception of the response message (s) from the previous visitor network entity, replacing the previously stored subscriber profile and the associated versions parameter with the subscriber profile and associated version parameter received in the response message.

15. The method of claim 1, wherein the network supports circuit switched communication, the home network entity is a home location register (HLR), and the visitor network entities are visitor location registers (VLRs).

16. The method of claim 1, wherein the network supports General Packet Radio Service (GPRS), the home network entity is a home location register (HLR) connected to a Gateway GPRS Support Node (GGSN), and the visiting network entities are Serving GPRS Support Nodes (SGSNs).

17. A system for handling subscriber data for a mobile station (MS) roaming in a network including home network entity containing information regarding subscribers to the network and one or more visitor network entities containing information regarding subscribers to one or more other networks, the system comprising:

means for receiving an update location request at a new visitor network entity serving an area into which the subscriber has roamed from an area served by a previous visitor network entity;

means for indicating the update location request to the home network entity;

means for determining whether a subscriber profile of the subscriber stored in the new visitor network entity needs updating;

means for determining whether conditions for updating the subscriber profile stored in the new visitor network entity from the previous visitor network entity are met; and means for, if the subscriber profile needs updating and the conditions are met, updating the subscriber profile stored in the new visitor network entity from the previous visitor network entity.

18. The system of claim 17, wherein the means for determining whether the subscriber profile needs updating comprises means for comparing in the home network entity a version parameter indicating a version of the subscriber profile stored in the new visitor network entity with a version parameter indicating a version of the subscriber profile stored in the home network entity.

19. The system of claim 17, wherein the means for determining whether the conditions for updating the subscriber profile in the new visitor network entity from the previous visitor network entity are met includes means for determining whether the previous visitor network entity is located in the same Public Land Mobile Network (PLMN) or in the same country as the new visitor network entity.

20. The system of claim 19, wherein this determination is made in the home network entity.

21. The system of claim 19, wherein this determination is made in the new visitor network entity.

22. The system of claim 21, further comprising means for sending to the previous visitor network entity a message requesting the transfer of a newer subscriber profile.

23. The system of claim 17, further comprising means for sending from the home network entity an update location response to the new visitor network entity indicating that the updated subscriber profile should be retrieved from the previous visitor network entity.

24. The system of claim 23, further comprising means for sending from the new visitor network entity a message to the previous visitor network entity requesting the updated subscriber profile to be transferred to the new visitor network entity.

25. The system of claim 24, further comprising means for returning from the previous visitor network entity the updated subscriber profile in one or several response message (s).

26. The system of claim 24, further comprising means for sending to the home network entity a restore message including the identity of the concerned subscriber if the subscriber profile cannot be retrieved from the previous visitor network entity.

27. The system of claim 26, wherein the message includes an explicit indication that the subscriber profile and its associated revision management parameter should be sent from the home network entity to the new visitor network entity.

28. The system of claim 17, wherein the means for determining whether the subscriber profile needs to be updated comprises comparing in the previous visitor network entity a version parameter indicating a version of the subscribe profile stored in the new visitor network entity with a version parameter indicating the version of the subscriber profile currently stored in the previous visitor network entity.

29. The system of claim 17, wherein the means for updating comprises means for sending from the previous visitor network entity to the new visitor network entity the newer subscriber profile and its associated version parameter in one or more response messages.

30. The system of claim 29, further comprising means for replacing the previously stored subscriber profile and the associated versions parameter with the subscriber profile and associated version parameter received in the response message, upon reception of the response message (s) from the previous visitor network entity.

31. The system of claim 17, wherein the network supports circuit switched communication, the home network entity is a home location register (HLR), and the visitor network entities are visitor location registers (VLRs).

32. The system of claim 17, wherein the network supports General Packet Radio Service (GPRS), the home network entity is a home location register (HLR) connected to a Gateway GPRS Support Node (GGSN), and the visiting network entities are Serving GPRS Support Nodes (SGSNs).

33. A method for handling subscriber data for a subscriber roaming in a network including a home network entity containing information regarding subscribers to the network and one or more visitor network entities containing information regarding subscribers to one or more other networks, the method comprising:

receiving at the home network entity a request to update a subscriber profile stored in a visitor network entity;

determining whether modifications recorded in the home network entity are sufficient to enable updating of the subscriber profile by comparing a version parameter of the subscriber profile stored in the visitor network entity with a version parameter of the subscriber profile stored in the home network entity, and if the version parameters are within a predetermine range, the modification recorded in home network entity are deemed sufficient; and if the modifications recorded are sufficient, sending the modifications from the home network entity to the visitor network entity.

34. The method of claim 33, further comprising, if the modifications recorded are not sufficient, sending the entire subscriber profile from the home network entity to the visitor network entity.

35. The method of claim 33, further comprising sending only indications of the modifications of the subscriber profile from the home network entity to the visitor network entity to indicate to the visitor network entity how its currently stored version of the subscriber profile should be updated to reflect the subscriber profile currently stored in the home network entity.

36. The method of claim 35, further comprising sending, together with the modification indications, a version parameter associated with the version of the subscriber profile currently stored in the home network entity.

37. The method of claim 36, further comprising, in the visitor network entity, replacing the previously stored version parameter with the version parameter received from the home network entity.

38. The method of claim 33, further comprising keeping track of modifications of the subscriber profile in the home network entity in order to be able to include all the relevant modification indications in a message.

39. The method of claim 33, further comprising, in the visitor network entity, using the modification indications to update the version of the subscriber profile previously stored in the visitor network entity to reflect the version of the subscriber profile currently stored in the home network entity.

40. The method of claim 33, wherein the network supports circuit-switched communications, the home network entity is a home location register (HLR), and the visitor network entity is a visitor location register (VLR).

41. The method of claim 33, wherein the network supports General Packet Radio Service, the home network entity is a home location register (HLR) connected to a Gateway GPRS Support Node (GGSN), and the visitor network entities are Serving GPRS Support Nodes (SGSNs).

42. A system for handling subscriber data for a subscriber roaming in a network including a home network entity containing information regarding subscribers to the network and one or more visitor network entities containing information regarding subscribers to one or more other networks, the method comprising:

means for receiving at the home network entity a request to update a subscriber profile stored in a visitor network entity;

means for determining whether modifications recorded in the home network entity are sufficient to enable updating of the subscriber profile by comparing a version parameter of the subscriber profile stored in the visitor network entity with a version parameter of the subscriber profile stored in the home network entity, and if the version parameters are within a predetermine range, the modifications recorded in the home network entity are deemed sufficient; and means for, if the modifications recorded are sufficient, sending the modifications from the home network entity to the visitor network entity.

43. The system of claim 42, further comprising, means for sending the entire subscriber profile from the home network entity to the visitor network entity if the modifications recorded are not sufficient.

44. The system of claim 43, further comprising means for sending only indications of the modifications of the subscriber profile from the home network entity to the visitor network entity to indicate to the visitor network entity how its currently stored version of the subscriber profile should be updated to reflect the subscriber profile currently stored in the home network entity.

45. The system of claim 46, further comprising means for sending, together with the modification indications, a version parameter associated with the version of the subscriber profile currently stored in the home network entity.

46. The system of claim 45, further comprising, in the visitor network entity, means for replacing the previously stored version parameter with the version parameter received from the home network entity.

47. The system of claim 43, further comprising means for keeping track of modifications of the subscriber profile in the home network entity in order to be able to include all the relevant modification indications in a message.

48. The system of claim 43, further comprising, in the visitor network entity, means for using the modification indications to update the version of the subscriber profile previously stored in the visitor network entity to reflect the version of the subscriber profile currently stored in the home network entity.

49. The system of claim 42, wherein the network supports circuit-switched communications, the home network entity is a home location register (HLR), and the visitor network entity is a visitor location register (VLR).

50. The system of claim 42, wherein the network supports General Packet Radio Service, the home network entity is a home location register (HLR) connected to a Gateway GPRS Support Node (GGSN), and the visitor network entities are Serving GPRS Support Nodes (SGSNs).

51. A method for handling subscriber data in a network including a home network entity containing information regarding subscribers to the network and one or more visitor network entitles containing information regarding subscribers to one or more other networks, the method comprising:

determining whether a predetermined amount of time has elapsed since the last contact between the subscriber and the network;

if so, preventing use of a temporary subscriber identity, valid for a time limit T, of the subscriber in the network; and when the time $T+\delta$, where $\delta$ is a small fraction of T, has elapsed since the last contact between the subscriber and the network, unallocating the temporary subscriber identity that was allocated to the subscriber.

52. The method of claim 51, wherein when the time T has elapsed since the last contact between the subscriber and the network, the subscriber does not use the temporary subscriber identity to identify itself to the network in a subsequent access attempt and does not respond to subsequent page messages including the temporary subscriber identity.

53. The method of claim 51, further comprising, within the time interval T±δ, where δ is a small fraction of T, since the lost contact between the subscriber and the network, preventing the network from using the temporary subscriber identity for identification in page messages.

54. The method of claim 53, further comprising broadcasting in every cell the values of the parameters T and 8, thereby making it possible to have different parameter values in different public land mobile networks(PLMNs) and in different service areas within the same PLMN.

55. The method of claim 51, wherein the same time limit principles apply even when a subscriber record is discarded from the visitor network entity.

56. The method of claim 51, wherein the network supports circuit-switched communication, the home network entity is a home location register (HLR), and the visitor network entities are visitor location registers (VLRs).

57. The method of claim 51, wherein the network supports General Packet Radio Service, the home network entity is a home location register (HLR) connected to a Gateway GPRS Support Node (GGSN), and the visitor network entities are Serving GPRS Support Nodes (SGSNs).

58. A system for handling subscriber data in a network including a home network entity containing information regarding subscribers to the network and one or more visitor network entities containing information regarding subscribers to one or more other networks, the system comprising:

means for determining whether a predetermined amount of time has elapsed since the last contact between the subscriber and the network;

means for preventing use of a temporary subscriber identity, valid for a time limit T, of the subscriber in the network if the predetermined amount of time has elapsed; and means for unallocating the temporary subscriber identity that was allocated to the subscriber, when the T+δ, where δ is a small fraction of T, has elapsed since the last contact between the subscriber and the network.

59. The system of claim 58, wherein when the time T has elapsed since the last contact between the subscriber and the network, the subscriber does not use the temporary subscriber identity to identify itself to the network in a subsequent access attempt and does not respond to subsequent page messages including the temporary subscriber identity.

60. The system of claim 58, further comprising means for preventing the network from using the temporary subscriber identity for identification in page messages within the time interval T±δ, where δ is a small fraction of T, since the last contact between the subscriber and the network.

61. The system of claim 60, further comprising means for broadcasting in every cell the values of the parameters T and 8, thereby making it possible to have different parameter values in different public land mobile networks (PLMNs) and in different service areas within the same PLMN.

62. The system of claim 58, wherein the same time limit principles apply even when a subscriber record is discarded from the visitor network entity.

63. The system of claim 58, wherein the network supports circuit-switched communication, the home network entity is a home location register (HLR), and the visitor network entities are visitor location registers (VLRs).

64. The system of claim 58, wherein the network supports General Packet Radio Service, the home network entity is a home location register (HLR) connected to a Gateway GPRS Support Node (GGSN), and the visitor network entities are Serving GPRS Support Nodes (SGSNs).

65. A method for handling subscriber data for a subscriber roaming in an network supporting packet switched communication and including a home network entity containing information regarding subscribers to the network and one or more visitor network entities containing information regarding subscribers to one or more other networks, the method comprising:

determining whether an attempted packet activation by the network for a subscriber at one of the visitor network entities is successful;

if the packet activation fails, indicating the failure to the home network entity and determining whether the failure was caused because a subscriber record was purged; and if the failure was caused because a subscriber record was purged, recording in the home network entity that a subscriber profile for the subscriber has been purged.

66. The method of claim 65, wherein the step of determining whether the failure was caused because a subscriber record was purged includes interpreting a message received from the visitor network entity regarding the cause of the failure and confirming the cause of the failure.

67. The method of claim 65, wherein the network supports General Packet Radio Service (GPRS), the home network entity is a home location register (HLR) connected to a Gateway GPRS Support Node (GGSN), and the visitor network entities are Serving GPRS Support Nodes (SGSNs).

68. A system for handling subscriber data for a subscriber roaming in an network supporting packet switched communication and including a home network entity containing information regarding subscribers to the network and one or more visitor network entities containing information regarding subscribers to one or more other networks, the system comprising:

means for determining whether an attempted packet activation by the network for a subscriber at one of the visitor network entities is successful;

means for, if the packet activation fails, for indicating the failure to the home network entity and determining whether the failure was caused because a subscriber record was purged; and means for recording in the home network entity that a subscriber profile for the subscriber has been purged, if the failure was caused because a subscriber record was purged.

69. The system of claim 68, wherein the means for determining whether the failure was caused because a subscriber record was purged includes means for interpreting a message received from the visitor network entity regarding the cause of the failure and means for confirming the cause of the failure.

70. The system of claim 68, wherein the network supports General Packet Radio Service (GPRS), the home network entity is a home location register (HLR) connected to a Gateway GPRS Support Node (GGSN), and the visitor network entities are Serving GPRS Support Nodes (SGSNs).

* * * * *